US010976858B2

(12) United States Patent
Kubo

(10) Patent No.: US 10,976,858 B2
(45) Date of Patent: Apr. 13, 2021

(54) DISPLAY APPARATUS, PROXIMITY DETECTION METHOD, AND DETECTION DEVICE

(71) Applicant: Japan Display Inc., Tokyo (JP)

(72) Inventor: Masaki Kubo, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 16/425,330

(22) Filed: May 29, 2019

(65) Prior Publication Data

US 2019/0369833 A1 Dec. 5, 2019

(30) Foreign Application Priority Data

Jun. 1, 2018 (JP) .............................. JP2018-106477

(51) Int. Cl.
| | |
|---|---|
| *G06F 3/041* | (2006.01) |
| *G02F 1/1333* | (2006.01) |
| *G06F 3/044* | (2006.01) |
| *G09G 3/36* | (2006.01) |

(52) U.S. Cl.
CPC ...... *G06F 3/04164* (2019.05); *G02F 1/13338* (2013.01); *G06F 3/0412* (2013.01); *G06F 3/0445* (2019.05); *G06F 3/0448* (2019.05); *G06F 3/04166* (2019.05); *G06F 2203/04108* (2013.01); *G09G 3/3677* (2013.01); *G09G 3/3688* (2013.01)

(58) Field of Classification Search
CPC ...................................................... G06F 3/0448
See application file for complete search history.

(56) References Cited

U.S. PATENT DOCUMENTS

| | | | |
|---|---|---|---|
| 2014/0225131 A1 | 8/2014 | Benson et al. | |
| 2016/0139733 A1* | 5/2016 | Noguchi | G09G 3/3648 |
| | | | 345/174 |
| 2017/0220163 A1* | 8/2017 | Kurasawa | G06F 3/0412 |
| 2018/0284924 A1* | 10/2018 | Watanabe | G02F 1/136286 |
| 2019/0056819 A1* | 2/2019 | Moon | G06F 3/0412 |
| 2019/0146621 A1* | 5/2019 | Aoki | G06F 3/044 |
| | | | 345/174 |
| 2019/0179465 A1* | 6/2019 | Miyasaka | G06F 3/044 |
| 2019/0214596 A1* | 7/2019 | Park | H01L 27/3276 |

(Continued)

FOREIGN PATENT DOCUMENTS

| | | |
|---|---|---|
| JP | 2014-045382 A | 3/2014 |
| JP | 2014-090312 A | 5/2014 |

(Continued)

*Primary Examiner* — Priyank J Shah
(74) *Attorney, Agent, or Firm* — K&L Gates LLP

(57) ABSTRACT

According to an aspect, a display apparatus includes: a first substrate that has a display region having an outer periphery with a recess; a plurality of first electrodes provided in the display region; a plurality of second electrodes provided facing the first electrodes; and a wiring line. At least one of the first electrodes has a shape formed along an outer periphery of the recess in the display region. At least one of the second electrodes includes a first partial electrode and a second partial electrode provided in a manner separated from the first partial electrode with the recess interposed therebetween. The wiring line extends along the outer periphery of the recess to couple the first partial electrode and the second partial electrode.

19 Claims, 10 Drawing Sheets

(56) References Cited

U.S. PATENT DOCUMENTS

2019/0331952 A1* 10/2019 Teranishi .............. G06F 3/0446
2019/0369787 A1* 12/2019 Park ........................ G06F 3/044

FOREIGN PATENT DOCUMENTS

| JP | 2014-222489 A | 11/2014 |
| JP | 2015-018424 A | 1/2015 |
| JP | 2016-033830 A | 3/2016 |
| JP | 2017-050029 A | 3/2017 |
| WO | 2014/126662 A1 | 8/2014 |

* cited by examiner

DISPLAY APPARATUS, PROXIMITY DETECTION METHOD, AND DETECTION DEVICE

CROSS-REFERENCE TO RELATED APPLICATIONS

This application claims priority from Japanese Application No. 2018-106477, filed on Jun. 1, 2018, the contents of which are incorporated by reference herein in its entirety.

BACKGROUND

1. Technical Field

The present disclosure relates to a display apparatus, a proximity detection method, and a detection device.

2. Description of the Related Art

In display apparatuses, such as smartphones, a display region may have a cutout (notch) as described in International Publication No. 2014-126662, for example. Such a display apparatus, which has such a cut-out region, can have a region provided with various devices, such as a sensor, a camera, and a button, while the size of the display region is kept as large as possible. The display apparatus may include a touch panel that can detect an in-proximity object.

The display apparatus with the cut-out region can appropriately detect an object in proximity to the display region by electrodes provided to the display region. The display apparatus, however, may possibly fail to appropriately detect an in-proximity object to the cut-out region because no electrode is provided in the cut-out region.

For the foregoing reasons, there is a need for a display apparatus, a proximity detection method, and a detection device that can appropriately detect an object in proximity to a cut-out (recess) region.

SUMMARY

According to an aspect, a display apparatus includes: a first substrate that has a display region having an outer periphery having part where a recess is formed; a plurality of first electrodes provided in the display region; a plurality of second electrodes provided facing the first electrodes in the display region; and a wiring line. At least one of the first electrodes has a shape formed along an outer periphery of the recess in the display region. At least one of the second electrodes includes a first partial electrode and a second partial electrode provided in a manner separated from the first partial electrode with the recess interposed therebetween. The wiring line extends along the outer periphery of the recess to couple the first partial electrode and the second partial electrode.

According to another aspect, a proximity detection method for detecting proximity to a display apparatus having a display region having an outer periphery with a recess, wherein the display apparatus includes a plurality of first electrodes provided in the display region, a plurality of second electrodes provided facing the first electrodes in the display region, and a wiring line, wherein at least one of the first electrodes has a shape formed along the recess in the display region, at least one of the second electrodes includes a first partial electrode and a second partial electrode provided in a manner separated from the first partial electrode with the recess interposed therebetween, and the wiring line extends along the recess to couple the first partial electrode and the second partial electrode; the method includes: detecting a proximity to the display region based on an electric field generated between the first electrodes and the second electrodes; and detecting a proximity to the recess based on an electric field generated between the first electrodes and the wiring line.

According to another aspect, a detection device includes: a first substrate that has an outer periphery having part where a recess is formed; a plurality of first electrodes provided on the first substrate; a plurality of second electrodes provided facing the first electrodes; and a wiring line. At least one of the first electrodes has a shape formed along an outer periphery of the recess. At least one of the second electrodes includes a first partial electrode and a second partial electrode provided in a manner separated from the first partial electrode with the recess interposed therebetween. The wiring line extends along the outer periphery of the recess to couple the first partial electrode and the second partial electrode.

DETAILED DESCRIPTION

Figure 1:
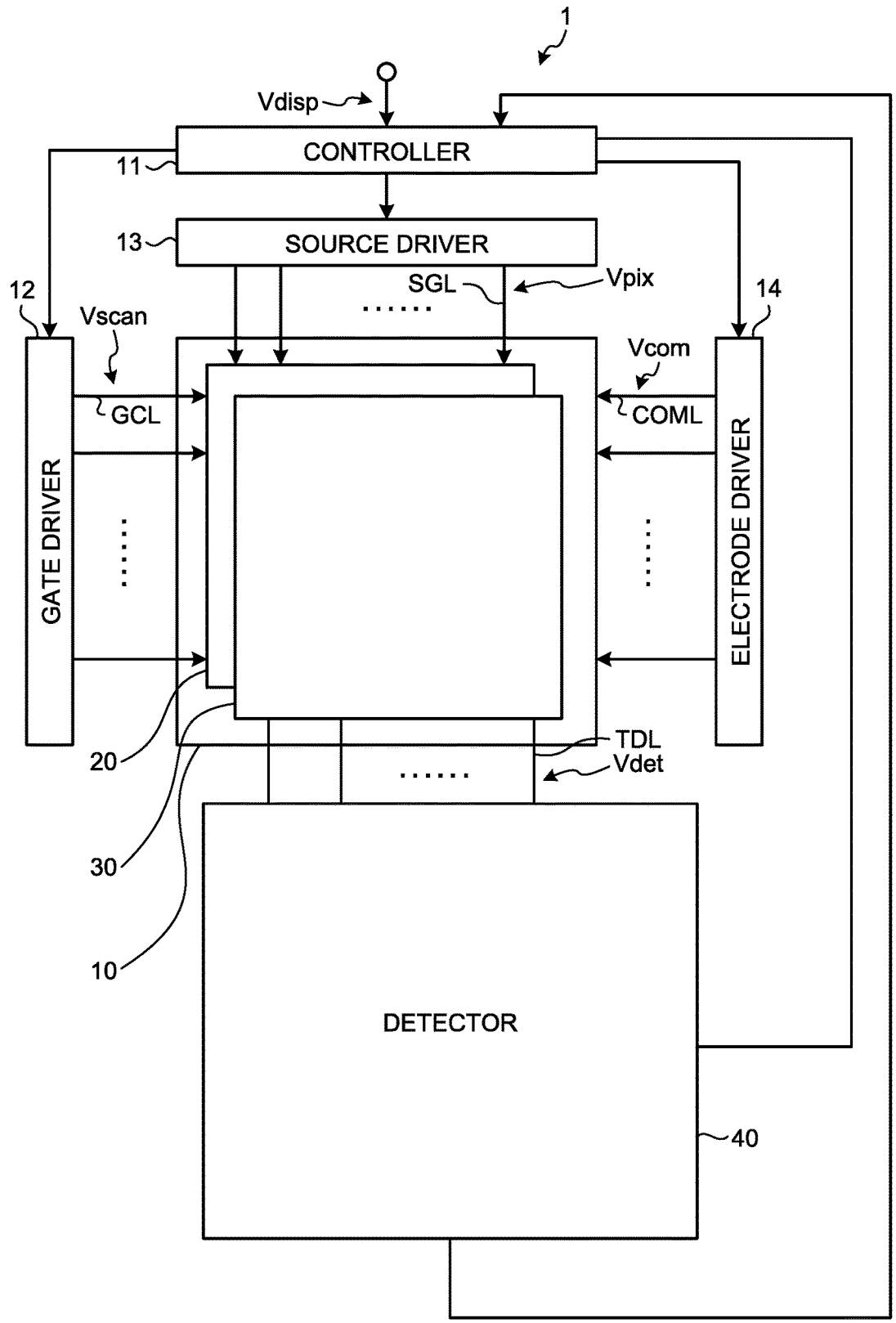
FIG. 1 is a block diagram of an exemplary configuration of a display apparatus according to an embodiment.

Exemplary embodiments according to the present invention are described below with reference to the accompanying drawings. What is disclosed herein is given by way of example only, and appropriate changes made without departing from the spirit of the present invention and easily conceivable by those skilled in the art naturally fall within the scope of the invention. The drawings may possibly illustrate the width, the thickness, the shape, and other elements of each unit more schematically than the actual aspect for the purpose of clarifying explanation. These elements, however, are given by way of example only and are not intended to limit interpretation of the present invention. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

Entire Configuration of the Display Apparatus

FIG. 1 is a block diagram of an exemplary configuration of a display apparatus according to an embodiment. The following describes the entire configuration of a display apparatus 1 according to the embodiment with reference to FIG. 1. The display apparatus 1 illustrated in FIG. 1 includes a touch sensor, that is, a touch detection function. The display apparatus 1 includes liquid crystal display pixels as display pixels. The display apparatus 1 is what is called an in-cell apparatus integrating a liquid crystal display panel 20 including the liquid crystal display pixels and a capacitance detection panel 30. The apparatus integrating the liquid crystal display panel 20 and the detection panel 30 indicates an apparatus in which the panels share at least part of members, such as substrates and electrodes, included in the panels. Touch in the embodiment means proximity, that is, at least one of a state where an object to be detected, such as a finger, is separated from but in proximity to the display apparatus 1 and a state where the object to be detected is in contact with the display apparatus 1.

As illustrated in FIG. 1, the display apparatus 1 according to the embodiment includes a display panel 10, a controller 11, a gate driver 12, a source driver 13, an electrode driver 14, and a detector 40. The controller 11, the gate driver 12, the source driver 13, and the electrode driver 14 serve as a display controller that causes the liquid crystal display panel 20 to display images. The controller 11, the electrode driver 14, and the detector 40 serve as a detection controller that causes the detection panel 30 to perform touch detection.

The display panel 10 includes a touch sensor, that is, a touch detection function. The display panel 10 includes the liquid crystal display panel 20 and the detection panel 30.

The liquid crystal display panel 20 sequentially scans horizontal lines one by one to perform display based on scanning signals Vscan output from the gate driver 12. The detection panel 30 sequentially scans blocks one by one to perform a touch detection operation based on detection drive signals Vcomt output from the electrode driver 14. The detection panel 30 outputs detection signals Vdet from a plurality of second electrodes Rx, which will be described later, and supplies them to the detector 40.

The controller 11 outputs control signals to the gate driver 12, the source driver 13, the electrode driver 14, and the detector 40 based on video signals Vdisp received from outside. The controller 11 thus performs control such that the gate driver 12, the source driver 13, the electrode driver 14, and the detector 40 operate synchronously with each other.

The gate driver 12 is a circuit that has a function of sequentially selecting one horizontal line on which a display operation is performed by the liquid crystal display panel 20 of the display panel 10 based on the control signals output from the controller 11. Specifically, the gate driver 12 applies the scanning signals Vscan to gates of TFT elements of pixels Pix included in the liquid crystal display panel 20 via scanning signal lines GCL. The gate driver 12 thus sequentially selects one row (one horizontal line), as a target of the display operation, out of the pixels Pix arrayed in a matrix (row-column configuration) in the liquid crystal display panel 20.

The source driver 13 is a circuit that outputs pixel signals Vpix to the respective pixels Pix in the liquid crystal display panel 20 of the display panel 10 based on the control signals output from the controller 11. Specifically, the source driver 13 outputs, via pixel signal lines SGL, the pixel signals Vpix to the respective pixels Pix included in one horizontal line sequentially selected by the gate driver 12. The pixels Pix included in one horizontal line receive the pixel signals Vpix, thereby performing the display operation.

The electrode driver 14 is a circuit that outputs drive signals Vcom to first electrodes Tx of the display panel 10 based on the control signals output from the controller 11. The drive signals Vcom include the detection drive signals Vcomt output to the first electrodes Tx in the detection operation and display drive signals Vcomd output to the first electrodes Tx in the display operation.

The detector 40 detects whether or not an object to be detected (e.g., a finger or a stylus) touches the detection panel 30, that is, whether or not the object to be detected is in contact with or in proximity to the detection panel 30 in a touch detection period, based on the control signals output from the controller 11 and the detection signals Vdet output from the second electrodes Rx of the detection panel 30. The detector 40 is a circuit that determines, when detecting that an object to be detected is in contact with or in proximity to the detection panel 30 (hereinafter, simply referred to as touch detection), the signal values (voltage values) in a region where the touch is detected and the coordinates at which the touch is considered to be made by the object to be detected. The detector 40 will be described later in greater detail.

Configuration of the Detection Panel

Figure 2:
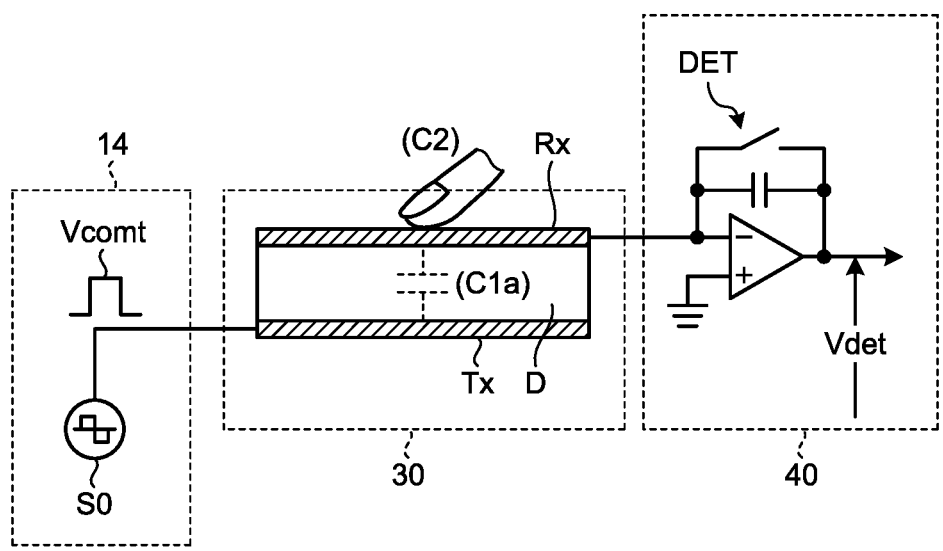
FIG. 2 is a diagram of an exemplary configuration of a detection panel according to the embodiment.

FIG. 2 is a diagram for explaining an operation performed by the detection panel 30. The detection panel 30 is a capacitance touch sensor and includes the first electrodes Tx and the second electrodes Rx. The first electrode Tx and the second electrode Rx face each other with a dielectric D interposed therebetween and form a capacitance element C1$a$. The first electrode Tx is supplied with the detection drive signal Vcomt from the electrode driver 14. The detection drive signal Vcomt is an alternating-current (AC) rectangular wave at a predetermined frequency (e.g., a frequency of the order of several kilohertz to several hundred kilohertz). The second electrode Rx is coupled to the detector 40. The detector 40 includes a voltage detector DET. The voltage detector DET is an integration circuit included in a signal amplifier 42 (refer to FIG. 8) of the detector 40, which will be described later, for example. The voltage detector DET converts changes in the electric current due to the detection drive signal Vcomt into changes in the voltage. The detector 40 determines contact or proximity by an object to be detected based on changes caused by a capacitance element C2 formed by the object to be detected (e.g., a finger or a stylus).

It is preferred that, in order to accurately detect a difference value |ΔV| indicating a change in voltage with respect to a reference voltage, the voltage detector DET has a period Reset in which electric charges accumulated in a capacitor is discharged by switching elements according to the frequency of the detection drive signal Vcomt. The reference voltage indicates a voltage value output from the voltage detector DET before being affected by the changes caused by the object to be detected.

An analog to digital (AD) converter 43 (refer to FIG. 8) of the detector 40, which will be described later, samples analog signals of the difference value |ΔV| output from the signal amplifier 42 at an appropriate timing, thereby converting the analog signals into digital signals. A signal processor 44 (refer to FIG. 8) of the detector 40, which will be described later, performs an arithmetic operation for averaging data (digital signals) of the difference value |ΔV| output from the AD converter 43, thereby calculating the average value of the difference value |ΔV|, for example. The signal processor 44 thus can reduce the effects of noise on the difference value |ΔV|. The signal processor 44 compares the calculated average value of the difference value |ΔV| with a predetermined threshold Vth. If the average value is equal to or greater than the threshold Vth, the signal processor 44 determines that an object to be detected touches (is in proximity to) the detection panel 30. By contrast, if the average value is less than the threshold Vth, the signal processor 44 determines that an object to be detected does not touch (is not in proximity to) the detection panel 30. The detection panel 30 thus can perform a touch detection operation.

Configuration of the Display Panel

Figure 3:
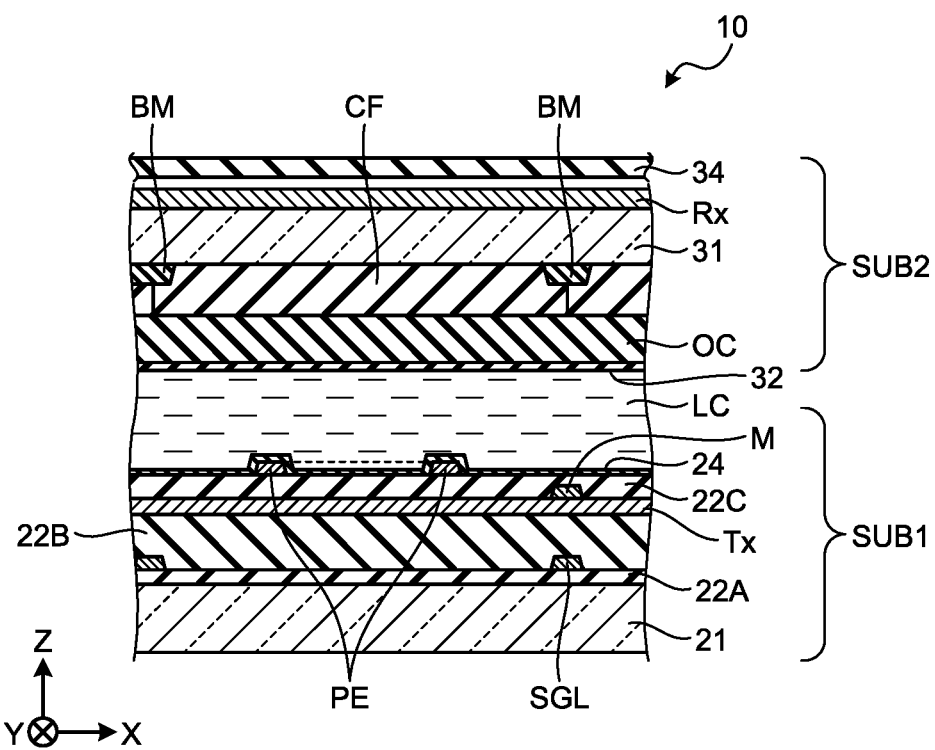
FIG. 3 is a schematic sectional view of a display panel according to the embodiment.
Figure 4:
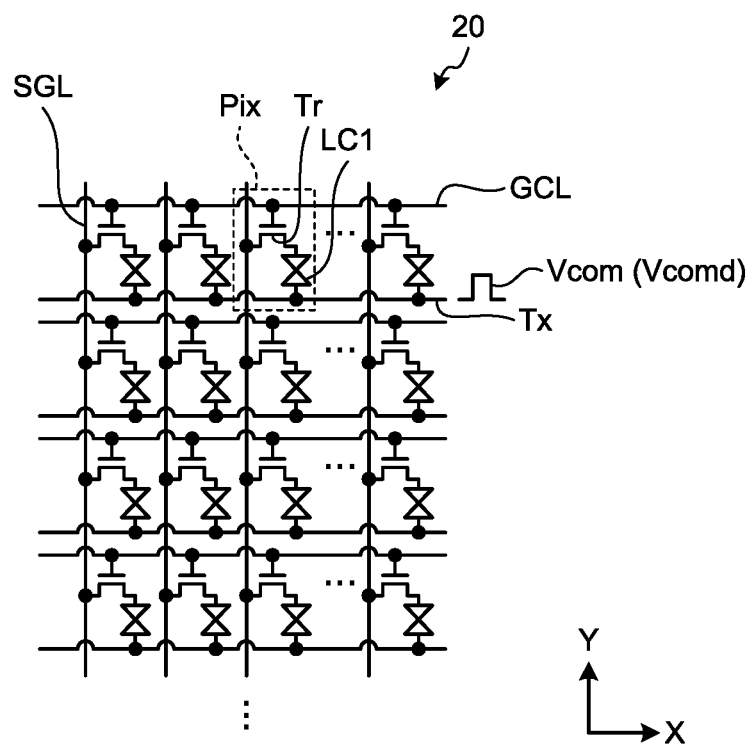
FIG. 4 is a circuit diagram of a pixel array according to the embodiment.

The following describes the configuration of the display panel 10 in greater detail. FIG. 3 is a schematic sectional view of the display panel according to the embodiment. FIG. 4 is a circuit diagram of a pixel array according to the embodiment. In the following description, an XYZ orthogonal coordinate system is used, and the positional relation between members is explained with reference to the XYZ orthogonal coordinate system. The X-axis direction corresponds to a second direction, which is one direction on a display plane of the display panel 10. The Y-axis direction corresponds to a first direction orthogonal to the second direction on the display plane. The Z-axis direction corresponds to a third direction orthogonal to the X-axis direction and the Y-axis direction (that is, a direction perpendicular to the X-Y plane). In the present specification, a planar view is a view seen in a normal direction to the X-Y plane parallel to the X-axis and the Y-axis. In the present specification, an upper side is the leading end side of the arrow indicating the Y-axis direction, and a lower side is the trailing end side of the arrow indicating the Y-axis direction. A right side is the leading end side of the arrow indicating the X-axis direction, and a left side is the trailing end side of the arrow indicating the X-axis direction. A front side is the leading end side of the arrow indicating the Z-axis direction, and a back side is the trailing end side of the arrow indicating the Z-axis direction.

As illustrated in FIG. 3, the display panel 10 includes a first substrate SUB1 and a second substrate SUB2 provided at a position facing the first substrate SUB1. The display panel 10 includes a liquid crystal layer LC between the first substrate SUB1 and the second substrate SUB2. The first substrate SUB1 is a thin-film transistor (TFT) substrate, for example. The second substrate SUB2 is a counter substrate.

Figure 5:
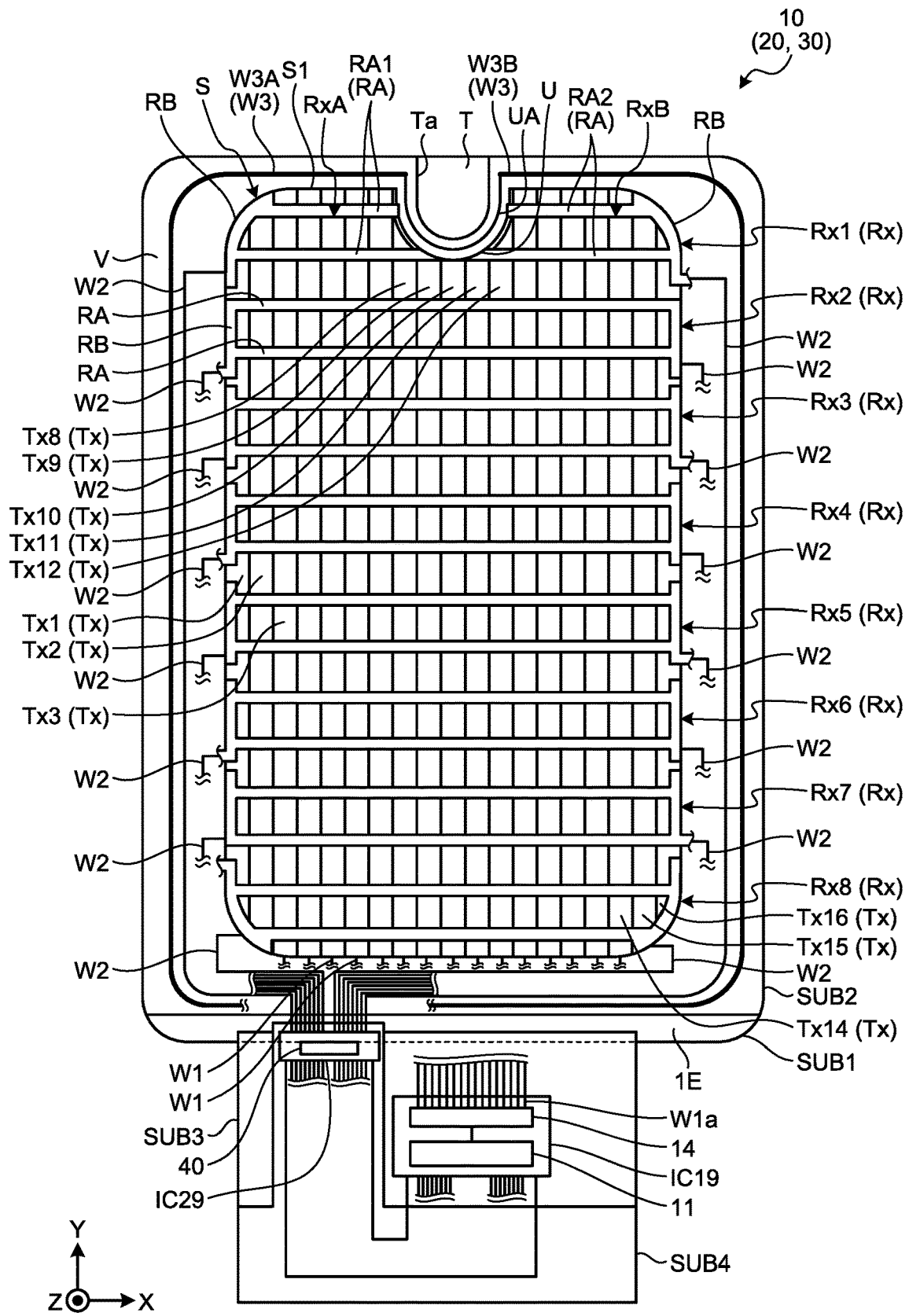
FIG. 5 is a plan view of the display apparatus according to the embodiment.

Besides the first substrate SUB1 and the second substrate SUB2, the display panel 10 includes an illumination apparatus, such as a backlight, disposed on the back side of the first substrate SUB1 and configured to output light through the first substrate SUB1, and other auxiliary equipment as needed. FIG. 5 does not illustrate the auxiliary equipment. The display panel 10 according to the embodiment is not limited to a liquid crystal panel including a touch sensor. The display panel 10 may be an organic electroluminescence (EL) panel including a touch sensor, for example. In other words, the display apparatus 1 may include an EL display panel 20A provided with organic light-emitting elements or inorganic light-emitting elements instead of the liquid crystal display panel 20. Alternatively, the display apparatus 1 may include an electrophoretic display panel 20B provided with electrophoretic elements.

The first substrate SUB1 has a multilayered structure including a substrate 21, an insulating film 22A, an insulating film 22B, the first electrodes Tx, an insulating film 22C, an orientation film 24, and pixel electrodes PE disposed in this order in the Z-axis direction. The substrate 21 is an insulating substrate and is a glass substrate, a resin substrate, or a resin film, for example. The insulating film 22A is provided on the substrate 21. The scanning signal lines GCL and switching elements Tr, which are not illustrated in FIG. 3, are provided between the substrate 21 and the insulating film 22A. The insulating film 22B is provided on the insulating film 22A. The pixel signal lines SGL, for example, are provided between the insulating film 22A and the insulating film 22B.

The first electrodes Tx are provided on the insulating film 22B. The first electrodes Tx are common electrodes that generate an electric field between the first electrodes Tx and the pixel electrodes PE to drive liquid crystal elements LC1 in the liquid crystal layer LC. The first electrodes Tx also serve as drive electrodes that generate an electric field between the first electrodes Tx and the second electrodes Rx, which will be described later, to detect a touch made by an object to be detected.

The insulating film 22C is provided on the first electrodes Tx. A metal layer M is provided at positions overlapping the respective pixel signal lines SGL between the insulating film 22C and the first electrodes Tx. The metal layer M is in contact with the first electrodes Tx right above the respective pixel signal lines SGL. While the metal layer M is provided on the first electrodes Tx in FIG. 3, it may be provided between the first electrodes Tx and the insulating film 22B. The insulating film 22C is provided on the first electrodes Tx. The pixel electrodes PE are provided on the insulating film 22C. The pixel electrodes PE face common electrodes with the insulating film 22C interposed therebetween. The pixel electrodes PE are included in the respective pixels Pix illustrated in FIG. 4. The orientation film 24 covers the pixel electrodes PE and the insulating film 22C. The pixel signal lines SGL, the scanning signal lines GCL, and the metal layer M are made of a metal material, such as molybdenum, tungsten, titanium, and aluminum, and may have a single-layered structure or a multilayered structure. The first electrodes Tx and the pixel electrodes PE are made of a translucent conductive material, such as indium tin oxide (ITO). The insulating films 22A and 22C are inorganic insulating films, for example. The insulating film 22B is an organic insulating film, for example. The metal layer M is not necessarily provided.

As described above, the display panel 10 is a display panel with a lateral electric-field system called an in-plane switching (IPS) system. The display panel 10 is not limited to a display panel with a lateral electric-field system and may be a display panel with a vertical electric-field system called a twisted nematic (TN) system or a vertical alignment (VA) system. In this case, for example, the pixel electrodes PE are disposed between the liquid crystal layer and the substrate 21, and the first electrodes Tx are disposed between the liquid crystal layer and a substrate 31. In other words, the first electrodes Tx and the pixel electrodes PE overlap in any desired manner. The configuration simply needs to enable the electric field between the first electrodes Tx and the pixel electrodes PE to drive the liquid crystal elements LC1 in the liquid crystal layer LC. The pixel electrodes PE according to the embodiment are disposed on the first electrodes Tx. The first electrodes Tx may be disposed on the insulating film 22B, and the pixel electrodes PE may be disposed on the insulating film 22C.

The second substrate SUB2 has a multilayered structure including the second electrodes Rx, the substrate 31, a light-shielding layer BM, a color filter CF, an overcoat layer OC, and an orientation film 32 disposed in this order in the opposite direction of the Z-axis direction (toward the back side of the display panel). The substrate 31 is an insulating substrate and is a glass substrate, a resin substrate, or a resin film, for example. The light-shielding layer BM and the color filter CF are provided in the opposite direction of the Z-axis direction with respect to the substrate 31 (at the lower side of the substrate 31). The color filter CF faces the pixel electrodes PE, and part of the color filter CF overlaps the light-shielding layer BM. The color filter CF includes a first color (red) color filter, a second color (green) color filter, and a third color (blue) color filter, for example. The overcoat layer OC covers the color filter CF. The orientation film 32 covers the overcoat layer OC. The color filter CF may be provided to the first substrate SUB1. The color filter CF may include color filters for four or more colors. A pixel that displays white may be provided with a white color filter or a colorless resin material or may be provided with the overcoat layer OC with no color filter. The liquid crystal layer LC is provided between the orientation film 32 of the second substrate SUB2 and the orientation film 24 of the first substrate SUB1.

The second electrodes Rx are provided in the Z-axis direction with respect to the substrate 31 (at the front side of the substrate 31). The second electrodes Rx are detection electrodes that can be used for detecting a touch based on an electric field generated between the second electrodes Rx and the first electrodes Tx. A polarizing plate 34 is provided in the Z-axis direction with respect to the second electrodes Rx (at the front side of the second electrodes).

A region of the first substrate SUB1 that faces the second substrate SUB2 is provided with a plurality of wiring lines. As illustrated in FIG. 4, examples of the wiring lines include, but are not limited to, the pixel signal lines SGL extending in the Y-axis direction and the scanning signal lines GCL extending in the X-axis direction. In the first substrate SUB1, a part at which the pixel signal line SGL and the scanning signal line GCL intersect corresponds to the smallest unit of display, that is, the pixel Pix (sub-pixel) illustrated in FIG. 4. A plurality of sub-pixels are arrayed in a matrix (row-column configuration), thereby forming the entire display region S. The pixels Pix each include the switching element Tr. The switching element Tr is a thin-film transistor (TFT), for example. The gate of the switching element Tr is coupled to the scanning signal line GCL, and one of the source and the drain of the switching element Tr is coupled to the pixel signal line SGL. The liquid crystal element LC1 serving as the display element includes the pixel electrode PE and the first electrode Tx. The other of the source and the drain of the switching element Tr is coupled to the pixel electrode PE.

FIG. 5 is a plan view of the display apparatus according to the embodiment. As illustrated in FIG. 5, the display panel 10 has a display region S and a cutout region T (a recess T). The display region S is a region in which images are displayed. The display region S is also a region on the X-Y plane in which the first electrodes Tx and the second electrodes Rx overlap when viewed in the Z-axis direction. As illustrated in FIG. 5, the display region S has a substantially rectangular shape with four sides in planar view. Specifically, the four corners of the rectangle have a curved shape (R-shape). More specifically, the display region S is cut downward (in the opposite direction of the Y-axis direction) from a part of a side S1, the side S1 being the upper side of the display region S (side in Y-axis direction). In other words, the display region S has an outer periphery having a partial section where a recess is formed, the recess extending along a direction (a center direction) from the outer periphery of the display region S toward the center in at least one of the X-axis direction and the Y-axis direction of the display region S. In the present specification, a cut-out simply indicates a recess and cutting out simply indicates forming a recess, which are not intended to limit the production method. If the display panel 10 is, for example, composed of a film substrate or the like, the recess (cutout region) T may be formed in the substrate by using a metal mold or the like, instead of by cutting the substrate.

As illustrated in FIG. 5, the cutout region (recess) T occupies a region of the display panel 10 other than the display region S in planar view. The cutout region T is a region in which the first electrodes Tx and the second electrodes Rx do not overlap when viewed in the Z-axis direction. Consequently, the cutout region T does not display any image. The cutout region T is a region cut out from the display region S, that is, the recess. Consequently, the cutout region T is a region recessed downward (in the center direction) from the cut side S1 of the display region S and indented into the display region S. The cut-out part of the display region S, that is, the cutout region T is also referred to as a notch.

In the example illustrated in FIG. 5, the display region S is cut on the side S1, and the cutout region T is indented into the display region S from the side S1. The position at which the display region S is cut is not limited thereto and may be any desired position. The display region S simply needs to have a shape cut in the center direction in a part of the outer periphery, and the cutout region T simply needs to occupy the cut-out region. The shape of the cut-out part of the display region S, that is, the shape of the cutout region T may be any desired shape. While the display region S has a substantially rectangular shape with four curved corners, the shape is not limited to a substantially rectangular shape and may be any desired shape as long as it has a cut-out part.

The display panel 10 has a peripheral region V between the outer edge of the first substrate SUB1 and the display region S. As in the case of the cutout region T, the peripheral region V is a region in which the first electrodes Tx and the second electrodes Rx do not overlap when viewed in the Z-axis direction and does not display any image. The peripheral region V has a terminal part 1E in which the first substrate SUB1 and the second substrate SUB2 do not overlap.

As described above, the display region S is a region in which the first electrodes Tx and the second electrodes Rx overlap. Consequently, the first electrodes Tx and the second electrodes Rx are provided in the display region S and have shapes along the outer periphery of the display region S. The first substrate SUB1 and the second substrate SUB2 are respectively provided with the first electrodes Tx and the second electrodes Rx and have shapes along the outer periphery of the display region S. In other words, as in the case of the display region S, the first substrate SUB1 and the second substrate SUB2 each have a cutout extending in the center direction in a part of the outer periphery. This cutout corresponds to the cutout region T. The following describes the shapes of the first electrodes Tx and the second electrodes Rx.

As illustrated in FIG. 5, each of the first electrodes Tx extends along the Y-axis direction from the upper side to the lower side of the display region S. The first electrodes Tx are arrayed along the X-axis direction. In this example according to the embodiment, 16 first electrodes Tx, that is, first electrodes Tx1 to Tx16 are provided along the X-axis direction. The number of first electrodes Tx may be any desired number greater than one.

The first electrodes Tx have shapes along the outer periphery of the display region S. Consequently, the first electrodes Tx1 and Tx16 are positioned at opposite ends in the X-axis direction, and each of the first electrodes Tx1 and Tx16 has parts of the outer periphery of at opposite ends in the Y-axis direction that have curved shapes along the curves (R-parts) of the respective corners of the display region S. In the example illustrated in FIG. 5, the curved parts of the respective corners of the display region S each extend across two or more first electrodes Tx. In the example illustrated in FIG. 5, parts of the outer peripheries of two or more first electrodes Tx (first electrodes Tx1 to Tx3 and Tx14 to Tx16) have curved shapes along the curves of the respective corners of the display region S when viewed from each end thereof in the X-axis direction.

At least one of the first electrodes Tx is provided near the cut-out part of the display region S, that is, near the cutout region T. Each of the first electrodes Tx near the cutout region T has the outer periphery formed along the outer periphery of the cut-out part (recess) of the display region S, that is, along an outer periphery Ta of the cutout region T. In other words, the first electrodes Tx near the cutout region T have shapes formed along the outer periphery of the cutout region T. In the example illustrated in FIG. 5, a right part of the outer periphery of the first electrode Tx8 is formed along the outer periphery of the cut-out part (recess) of the display region S. In other words, the right part of the outer periphery of the first electrode Tx8 is formed along the outer periphery Ta of the cutout region T. Upper parts of the outer peripheries of the first electrodes Tx9 to Tx11 are formed along the upper outer periphery of the cut-out part of the display region S. In other words, the upper parts of the outer peripheries of the first electrodes Tx9 to Tx11 are formed along the outer periphery Ta on the lower side of the cutout region T. A left part of the outer periphery of the first electrode Tx12 is formed along the outer periphery of the cut-out part (recess) of the display region S. In other words, the left part of the outer periphery of the first electrode Tx12 is formed along the outer periphery Ta of the cutout region T. The first electrodes Tx near the cutout region T refer to first electrodes Tx the positions of which in the X-axis direction overlap the position of the cutout region T in the X-axis direction. In other words, if the cutout region T is positioned at the center in the X-axis direction, the first electrodes Tx positioned at the center in the X-axis direction correspond to the first electrodes Tx near the cutout region T. In the example illustrated in FIG. 5, the first electrodes Tx near the cutout region T correspond to five first electrodes Tx positioned at the center. The positions and the number of first electrodes Tx near the cutout region T vary depending on the position and the size of the cutout region T in the X-axis direction. The number of first electrodes Tx near the cutout region T may be one, for example.

As described above, the first electrodes Tx differ in shape depending on the positions at which they are provided. The first electrodes Tx positioned at the opposite ends in the X-axis direction, for example, have shapes including the curved parts along the curves of the respective corners of the display region S. Each of the first electrodes Tx near the cutout region T has a shape including a part formed along the outer periphery Ta of the cutout region T. The other first electrodes Tx each have a rectangular shape.

As illustrated in FIG. 5, each of the second electrodes Rx extends along the X-axis direction from the left side to the right side of the display region S. The second electrodes Rx are arrayed along the Y-axis direction. In this example according to the embodiment, eight second electrodes Rx, that is, second electrodes Rx1 to Rx8 are provided along the Y-axis direction. The number of second electrodes Rx may be any desired number greater than one.

The second electrodes Rx each include detection portions RA and coupling portions RB. The detection portions RA extend in the X-axis direction and are arrayed in the Y-axis direction. The coupling portions RB correspond to opposite ends of the second electrode Rx in the X-axis direction, that is, one of the coupling portions RB is the right end of the second electrode Rx and the other one thereof is the left end of the second electrode Rx. The coupling portions RB couple the detection portions RA arranged adjacent to each other in the Y-axis direction. In other words, the second electrode Rx has a configuration in which two detection portions RA arranged in the Y-axis direction are coupled by the coupling portions RB at the opposite ends in the X-axis direction. While the coupling portions RB couple the two detection portions RA arranged adjacent to each other in the Y-axis direction, the configuration is not limited thereto. The coupling portions RB may couple three or more detection portions RA. The coupling portion RB may be provided to only one of the right end and the left end of the second electrodes Rx. The second electrode Rx may be composed of one detection portion RA. In this case, the coupling portion RB can be omitted.

The second electrodes Rx1 and Rx8 positioned at the opposite ends in the Y-axis direction out of the second electrodes Rx are formed such that the outer peripheries thereof at the opposite ends in the X-axis direction have curved shapes along the curves of the respective corners of the display region S. In other words, the second electrodes Rx1 and Rx8 are formed such that the outer peripheries of the coupling portions RB positioned at opposite ends in the X-axis direction have curved shapes along the curves of the respective corners of the display region S.

At least one of the second electrodes Rx is provided near the cut-out part of the display region S, that is, near the cutout region T. The second electrode Rx (second electrode Rx1 in FIG. 5) near the cutout region T has two partial electrodes with the cutout region T sandwiched therebetween. In other words, the second electrode Rx near the cutout region T includes a first partial electrode RxA and a second partial electrode RxB. The first partial electrode RxA is disposed on one side (left side) of the cutout region T. The second partial electrode RxB is disposed on the other side (right side) of the cutout region T. The first partial electrode RxA and the second partial electrode RxB are separated from each other with the cutout region T sandwiched therebetween. In other words, the first partial electrode RxA and the second partial electrode RxB are disposed sandwiching (surrounding) the cutout region T. More specifically, the first partial electrode RxA includes the left coupling portion RB and two first partial detection portions RA1 extending toward right from the coupling portion RB. The second partial electrode RxB includes the right coupling portion RB and two second partial detection portions RA2 extending toward left from the coupling portion RB. The right ends of the first partial detection portions RA1 face the left ends of the second partial detection portions RA2 across the cutout region T. The first partial electrode RxA and the second partial electrode RxB are coupled to each other via a wiring line U. The wiring line U is disposed along the cutout region T.

The first partial electrode RxA may be composed of one first partial detection portion RA1, and the second partial electrode RxB may be composed of one second partial detection portion RA2. In this case, each of the first partial electrode RxA and second partial electrode RxB does not need the coupling portion RB. Therefore, the one first partial detection portion RA1 corresponds to the first partial electrode RxA, and the one second partial detection portion RA2 corresponds to the second partial electrode RxB. The names of components in the display apparatus are not limited to the names exemplified in the present embodiment. For example, each of the partial detection portions RA may be referred to as a partial electrode RA. In this case, the configuration of the second electrode Rx1 illustrated in FIG. 5 can be described as follows: The second electrode Rx1 includes four partial electrodes RA (first to fourth partial electrodes RA) and two coupling portions RB (first and second coupling portions RB). That is, the first and third partial electrodes RA referred to here correspond to two partial detection portions RA included in the first partial electrode RxA described above, and the second and fourth partial electrodes RA referred to here correspond to two partial detection portions RA included in the second partial electrode RxB described above. Specifically, the first and second partial electrodes RA are separated from each other with the cutout region T interposed therebetween. The third and fourth partial electrodes RA are separated from each other with the cutout region T interposed therebetween. The first and third partial electrodes RA are disposed on one side (left side) of the cutout region T and arranged next to each other in the Y-axis direction. The first and third partial electrodes RA extend toward right from the coupling portion RB disposed on the left side of the recess T. The first partial electrode RA is disposed on the upper side of the third partial electrode RA in FIG. 7; in other words, the first partial electrode RA is disposed closer to the left end of the curved wiring line U than the third partial electrode RA is. In the X-axis direction, the length of the third partial electrode RA is therefore longer than the first partial electrode RA. The second and fourth partial electrodes RA are disposed on the other side (right side) of the cutout region T and arranged next to each other in the Y-axis direction. The second and fourth partial electrodes RA extend toward left from the coupling portion RB disposed on the right side of the recess T. The second partial electrode RA is disposed on the upper side of the fourth partial electrode RA in FIG. 7; in other words, the second partial electrode RA is disposed closer to the right end of the curved wiring line U than the fourth partial electrode RA is. In the X-axis direction, the length of the fourth partial electrode RA is therefore longer than the second partial electrode RA.

As described above, the second electrode Rx near the cutout region T includes the first partial electrode RxA and the second partial electrode RxB that face each other across the cutout region T. The second electrode Rx near the cutout region T refers to a second electrode Rx the position of which in the Y-axis direction overlaps the position of the cutout region T in the Y-axis direction. That is, the cutout region T in the example illustrated in FIG. 5 extends only to the region of one second electrode Rx in the Y-axis direction, and thus only the second electrode Rx1 corresponds to the second electrode Rx near the cutout region T in this case. If the cutout region T extends to the region of more than one of the second electrodes Rx in the Y-axis direction, for example, each of the more than one of the second electrodes Rx corresponds to the second electrode Rx near the cutout region T, that is, corresponds to the second electrode Rx including the first partial electrode RxA and the second partial electrode RxB. As illustrated in FIG. 5 and other figures, a second electrode Rx1 near the cutout region T includes the first partial electrode RxA and the second partial electrode RxB. A second electrode Rx2 arranged next to the second electrode Rx1 in the Y-axis direction extends in the X-axis direction. The length of the second electrode Rx2 is longer than the length of the first partial electrode RxA of the second electrode Rx1 in the X-axis direction. The length of the second electrode Rx2 is longer than the length of the second partial electrode RxB of the second electrode Rx1 in the X-axis direction.

The first substrate SUB1 is coupled to a third substrate SUB3 at the lower end (terminal part 1E) in the Y-axis direction. The third substrate SUB3 is provided with an integrated circuit (IC) 19 serving as a driver IC. The IC 19 includes the electrode driver 14 and the controller 11. The first electrodes Tx are coupled to the IC 19 via first wiring lines W1 extending on the first substrate SUB1 and wiring lines W1a on the third substrate SUB3. In the example illustrated in FIG. 5, coupling between the first wiring lines W1 and the wiring lines W1a is not illustrated for convenience of illustration. In the actual configuration, however, the first wiring lines W1 and the wiring lines W1a are coupled with each other. While the IC 19 is disposed on the third substrate SUB3, it may be disposed on the first substrate SUB1. While the gate driver 12 and the source driver 13 are disposed on the first substrate SUB1, and the electrode driver 14 is included in the IC 19, the configuration is not limited thereto. At least one of the gate driver 12 and the source driver 13 may be included in the IC 19, and the electrode driver 14 may be disposed on the first substrate SUB1.

The second substrate SUB2 is coupled to a fourth substrate SUB4 at the lower end in the Y-axis direction. The fourth substrate SUB4 is coupled to the third substrate SUB3 and provided with an IC 29 serving as a touch IC. The IC 29 includes the detector 40. The second electrodes Rx are coupled to the IC 29 via second wiring lines W2 disposed in the peripheral region V of the second substrate SUB2 and wiring on the third substrate SUB3. The second electrodes Rx are also coupled to the IC 19 via the second wiring lines W2, the wiring on the third substrate SUB3, and wiring on the fourth substrate SUB4. The second wiring lines W2 are disposed at both ends of the second substrate SUB2 in the X-axis direction and extend in the Y-axis direction.

The second wiring lines W2 may be disposed at only one end of the second substrate SUB2 in the X-axis direction. The second wiring lines W2 may be coupled to, among first and second ends of the second electrodes Rx in the X-axis direction, only first ends of the second electrodes Rx. Furthermore, the second wiring lines W2 may be alternately coupled to the first ends and second ends of the second electrodes Rx in the X-axis direction. More specifically, in the second electrodes Rx next to each other, one second wiring line W2 is coupled to the first end of one second electrode Rx in the X-axis direction, and another second wiring line W2 is coupled to the second end of the other second electrode Rx in the X-axis direction.

The second substrate SUB2 includes a third wiring line W3 disposed along the outer periphery of the second substrate SUB2. The third wiring line W3 is positioned between the outer periphery of the second substrate SUB2 and the second wiring line W2 closest to the outer periphery of the second substrate SUB2. The third wiring line W3 includes a first partial wiring line W3A and a second partial wiring line W3B with the cutout region T sandwiched therebetween. The first partial wiring line W3A is disposed on one side (left side) of the cutout region T. The second partial wiring line W3B is disposed on the other side (right side) of the cutout region T. The first partial wiring line W3A and the second partial wiring line W3B are coupled via a wiring line (coupling line) UA. While the third wiring line W3 extends continuously along at least three sides of the second substrate SUB2, it may have a slit and be divided into two partial wiring lines on each of the sides.

The third wiring line W3 is coupled to a fixed potential and disposed to protect the display panel 10 from electrostatic discharge (ESD) applied from outside. The third wiring line W3 is maintained at an electric potential substantially equal to that of the second electrodes Rx. The third wiring line W3 is supplied with an electric potential closer to a potential supplied to the second electrodes Rx than a reference potential (ground potential). The third wiring line W3 is supplied with a fixed potential of 1.8 V, and the second electrodes Rx are supplied with an electric potential of 1.5 V, for example.

Figure 6:
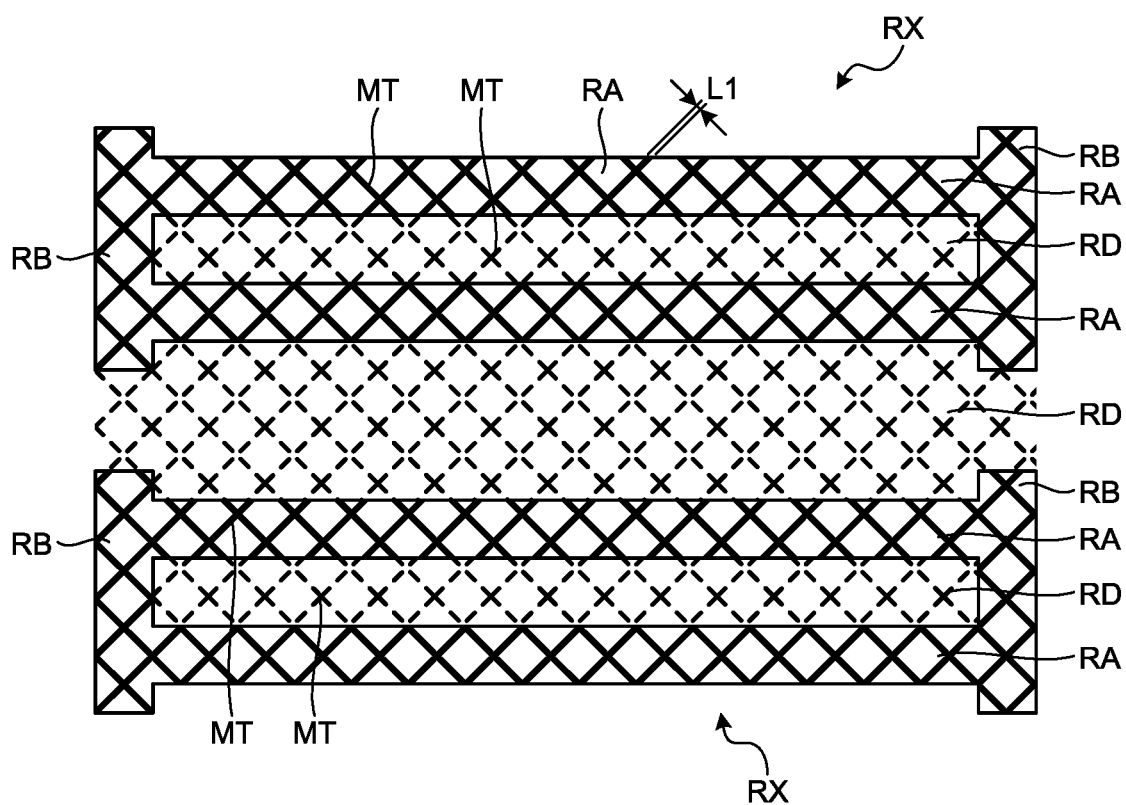
FIG. 6 is a diagram of an exemplary configuration of second electrodes.

FIG. 6 is a diagram of an exemplary configuration of the second electrodes. As illustrated in FIG. 6, the second electrodes Rx are each composed of a plurality of metal lines MT. The metal line MT is a thin metal line having a width L1 (outer diameter) viewed in the Z-axis direction illustrated in FIG. 7 of 1 μm to 10 μm, and more specifically, approximately 5 μm, for example. The metal line MT is made of any one of aluminum, aluminum alloy, copper, and copper alloy, for example. The metal lines MT may have a single-layered structure or a multilayered structure. The second electrode Rx has a strip shape formed by combining a plurality of metal lines MT in a mesh shape, that is, by crossing a plurality of metal lines MT. The metal lines MT continuously extend without any break, thereby electrically coupling a plurality of parts in the second electrode Rx. More specifically, the metal lines MT continuously extend without any break across the detection portions RA and the coupling portions RB in the second electrode Rx, thereby electrically coupling the detection portions RA and the coupling portions RB. The second electrode Rx simply needs to be composed of the metal lines MT, and the metal lines MT are not necessarily combined in a mesh shape. The second electrode Rx, for example, may be composed of a plurality of wavy metal lines MT.

As illustrated in FIG. 6, dummy electrodes RD are provided between the second electrodes Rx next to each other and between the detection portions RA in each of the second electrodes Rx. As in the case of the second electrodes Rx, the dummy electrodes RD are each composed of the metal lines MT. In the dummy electrode RD, however, the metal lines MT extend discontinuously and are broken off. With this structure, the dummy electrodes RD electrically uncouple the second electrodes Rx from one another and electrically uncouple the detection portions RA from one another. The second electrodes Rx and the dummy electrodes RD are integrally produced, for example. Specifically, the dummy electrodes RD and the second electrodes Rx can be produced by: preparing a strip-shaped member composed of the metal lines MT continuously extending in a mesh shape, processing the regions to serve as the dummy electrodes RD such that the metal lines MT are broken off, and not processing the metal lines MT in the regions to serve as the second electrodes Rx. The method for producing the second electrodes Rx and the dummy electrodes RD is not limited thereto and may be any desired method. The dummy electrodes RD are not necessarily provided.

The first electrodes Tx and the second electrodes Rx have the configuration described above. As described above, the second electrode Rx near the cutout region T includes the first partial electrode RxA and the second partial electrode RxB. The first partial electrode RxA and the second partial electrode RxB are coupled to each other via the wiring line U. The following describes the wiring line U.

Figure 7:
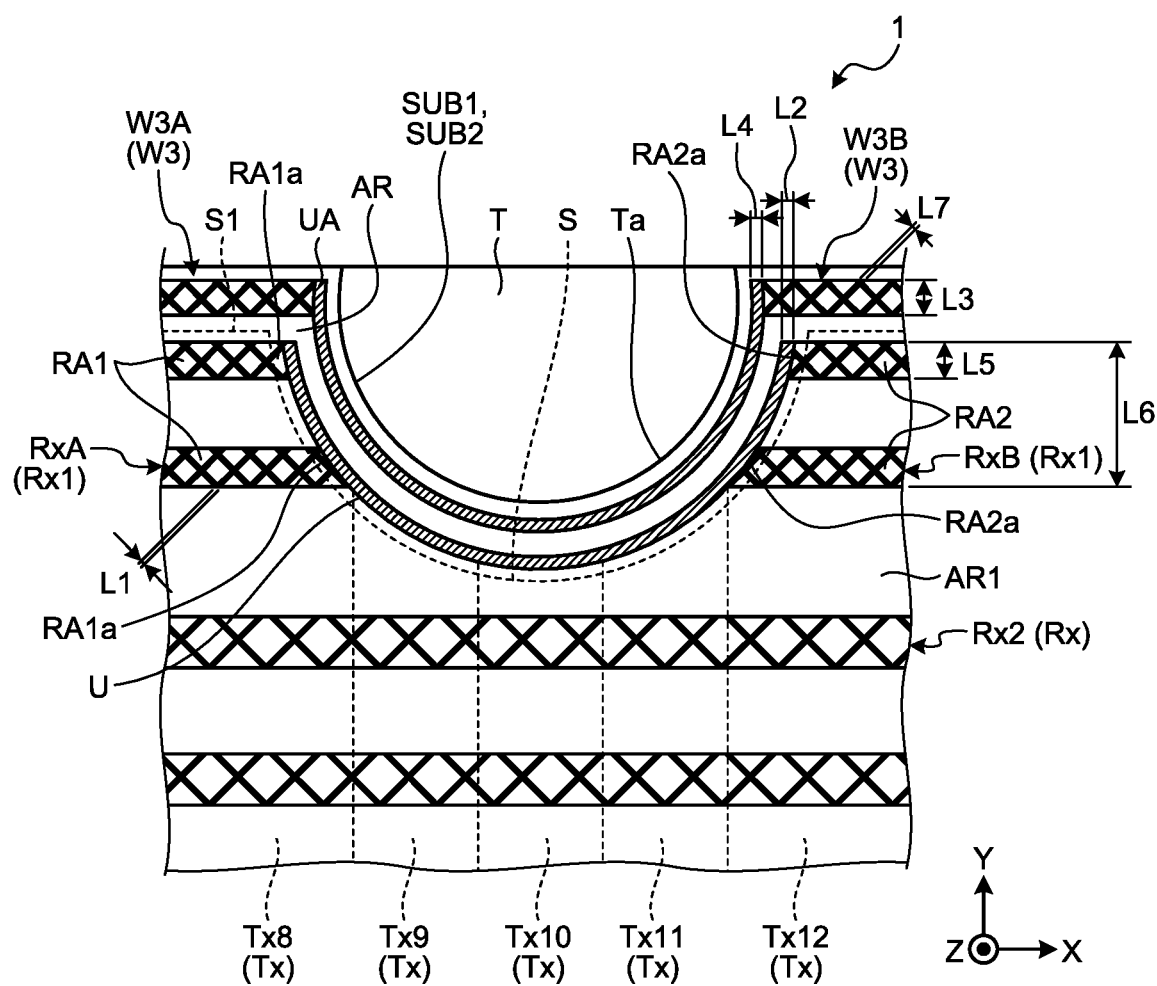
FIG. 7 is a schematic enlarged view of the display panel according to the embodiment.

FIG. 7 is a schematic enlarged view of the display panel according to the embodiment.

FIG. 7 is a schematic enlarged view of a part near the cutout region T in the display panel 10. The shape of the part near the cutout region T is described first in order to explain the wiring line U. FIG. 7 does not illustrate the dummy electrodes RD provided between the second electrodes Rx. As described above, the first electrodes Tx (first electrodes Tx8 to Tx12) near the cutout region T have the outer periphery formed along the outer periphery Ta of the cutout region T and aligned in the X-axis direction. The second electrode Rx (second electrode Rx1) near the cutout region T includes the first partial electrode RxA and the second partial electrode RxB facing across the cutout region T.

As described above, the display region S is a region in which the first electrodes Tx and the second electrodes Rx overlap. Consequently, the display region S corresponds to the region along the outer periphery (outer edge) of the first electrodes Tx in FIG. 7, that is, the region surrounded by the outermost broken line in FIG. 7. In the embodiment, the outer peripheries (outer edges) of the first substrate SUB1 and the second substrate SUB2 are positioned farther away from the center of the display region S than the outer periphery of the first electrodes Tx and the second electrodes Rx, that is, the outer periphery of the display region S. In other words, the peripheral region V is positioned between the outer periphery of the display region S and the outer peripheries of the first substrate SUB1 and the second substrate SUB2. As described above, the cutout region T is a region in which the first electrodes Tx and the second electrodes Rx do not overlap when viewed in the Z-axis direction. The cutout region T is also a region cut out from the first substrate SUB1 and the second substrate SUB2. In other words, the outer periphery Ta of the cutout region T overlaps the outer peripheries of the first substrate SUB1 and the second substrate SUB2. In FIG. 7, the cutout region T is a semicircular region surrounded by the solid line. That is, the cutout region T is in contact with the outer peripheries of the first substrate SUB1 and the second substrate SUB2 each forming a notch but is not in contact with the display region S. In other words, the peripheral region V includes a region AR positioned between the display region S and the cutout region T. The region AR is a region in which the first electrodes Tx and the second electrodes Rx do not overlap in the region where the first substrate SUB1 and the second substrate SUB2 overlap. More specifically, the region AR is positioned outside the region in which the first electrodes Tx and the second electrodes Rx overlap. In other words, the region AR is positioned outside the display region S and inside the first substrate SUB1 and the second substrate SUB2. The region including the cutout region T and the region AR illustrated in FIG. 7 may be defined as a cutout region.

The wiring line U is arranged in the region AR and extends along the outer periphery of the cutout region T. The wiring line U couples the first partial electrode RxA and the second partial electrode RxB. Specifically, the wiring line U is provided outside the display region S. More specifically, the wiring line U is provided between the display region S and the cutout region T. Assume that the right end of the first partial detection portion RA1 is an end RA1a, and the left end of the second partial detection portion RA2 is an end RA2a. In this case, the wiring line U is disposed as follows: one end of the wiring line U is coupled to the end RA1a of the upper first partial detection portion RA1 (the first partial detection portion RA1 on the side in the Y-axis direction); the wiring line U extends along the outer periphery Ta of the cutout region T in the X-axis direction so as to be coupled to the end RA1a of the lower first partial detection portion RA1 and the end RA2a of the lower second partial detection portion RA2; and the other end of the wiring line U is coupled to the end RA2a of the upper second partial detection portion RA2. With this configuration, the wiring line U electrically couples the first partial electrode RxA and the second partial electrode RxB. If more than one second electrode Rx including the first partial electrode RxA and the second partial electrode RxB is provided, more than one wiring line U is provided for the respective second electrodes Rx. In this case, the wiring lines U are not coupled to one another, and each of the wiring lines U is not coupled to the second electrodes Rx other than the second electrode Rx to which the wiring line U is coupled. In the example illustrated in FIG. 7, the ends RA1a of the first partial detection portions RA1 and the ends RA2a of the second partial detection portions RA2 protrude to the region AR.

The wiring line U is a conductive line and is a metal line in this example. More specifically, the wiring line U is made of any one of aluminum, aluminum alloy, copper, and copper alloy, for example. The wiring line U may have a single-layered structure or a multilayered structure. The wiring line U may be made of the same material as that of the second electrodes Rx. The outer diameter of the wiring line U is greater than that of each of the metal lines MT constituting the second electrodes Rx. A width L2 (outer diameter) of the wiring line U viewed in the Z-axis direction is 10 µm to 50 µm, for example, and more specifically, approximately 30 µm. The width L2 of the wiring line U is less than a length L6 of the second electrode Rx in the Y-axis direction. The length L6 of the second electrode Rx in the Y-axis direction is 3 mm to 5 mm, for example, and more specifically, approximately 4 mm. More specifically, the width L2 of the wiring line U is less than a length L5 of the first partial electrode RxA and the second partial electrode RxB in the Y-axis direction (that is, the length of the detection portion RA in the Y-axis direction). The length L5 of the detection portion RA in the Y-direction is 200 µm to 400 µm, for example, and more specifically, approximately 300 µm. The width L2 of the wiring line U viewed in the Z-axis direction is greater than the width L1 of the metal line MT viewed in the Z-axis direction. Consequently, the area (cross-sectional area) of a section of the wiring line U along a direction orthogonal to the longitudinal direction is larger than the area (cross-sectional area) of a section of the metal line MT along a direction orthogonal to the longitudinal direction. The width of the second electrode Rx2 (the width of the detection portion RA of the second electrode Rx2) is greater than the width of the first partial electrode RxA of the second electrode Rx1 (the width of the first partial detection portion RA1) in the Y-axis direction.

The region AR is also provided with the wiring line UA. The wiring line UA is provided in the region AR and outside the wiring line U. In other words, the wiring line UA is provided between the cutout region T and the wiring line U. The wiring line UA extends along the wiring line U, that is, along the outer periphery of the cutout region T. The wiring line UA is a metal wiring line similar to the wiring line U. The wiring line UA is not coupled to the conductive members (the wiring line U, the first electrodes Tx, and the second electrodes Rx in this example) in the display region S.

The wiring line UA couples the first partial wiring line W3A and the second partial wiring line W3B. A width L3 of the first partial wiring line W3A and the second partial wiring line W3B viewed in the Z-axis direction is greater than a width L4 of the wiring line UA viewed in the Z-axis direction. The width L3 is the width of the third wiring line W3 and is 300 µm to 500 µm, for example, and more specifically, approximately 400 µm. In this embodiment, the width L3 is greater than the length L5. The width L4 of the wiring line UA is 10 µm to 50 µm, for example, and more specifically, approximately 30 µm. In other words, the width L4 of the wiring line UA is substantially equal to the width L2 of the wiring line U. As in the case of the second electrodes Rx, the third wiring line W3 is composed of mesh-shaped metal lines. A width L7 of the metal line of the third wiring line W3 is 1 µm to 10 µm, for example, and more specifically, approximately 5 µm. In other words, the width L7 of the metal line of the third wiring line W3 is substantially equal to the width L1 of the metal line MT of the second electrodes Rx.

The display panel 10 has the configuration described above. As described above, the display panel 10 has the cutout region (recess) T. The cutout region T is provided with a device other than the display panel 10, such as a sensor, a camera, and a button. The display panel 10 detects a touch (proximity) made by an object to be detected in the display region S based on an electric field between the first electrode Tx and the second electrode Rx provided in the display region S, that is, the difference value |ΔV| of the voltage between the first electrode Tx and the second electrode Rx. The cutout region T, however, is not provided with either the first electrodes Tx or the second electrodes Rx. If an object to be detected touches the cutout region T, the difference value |ΔV| of the voltage between the first electrode Tx and the second electrode Rx remains small, which makes it difficult to detect the touch (proximity) in the cutout region T. By contrast, the display panel 10 according to the embodiment includes the wiring line U. If a voltage (the detection drive signal Vcomt) is applied to the first electrode Tx, an electric field is also generated between the first electrode Tx and the wiring line U. The wiring line U is provided in the region AR adjacent to the cutout region T. If an object to be detected touches the cutout region T, the wiring line U functions as a detection electrode and can appropriately change the difference value |ΔV| of the voltage between the first electrode Tx and the wiring line U. With the wiring line U that couples the first partial electrode RxA and the second partial electrode RxB, the display panel 10 according to the embodiment can appropriately detect a touch in the cutout region T without any additional sensor in the cutout region T. The following describes an example of the method for detecting a touch in the display region S and the cutout region T.

Touch Detection

Figure 8:
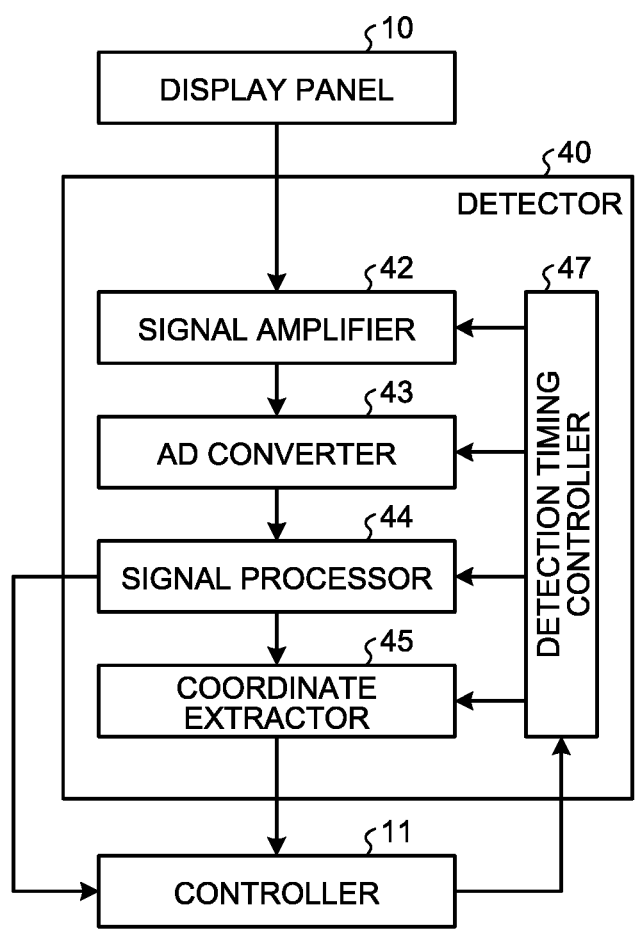
FIG. 8 is a schematic block diagram of a detector according to the embodiment.

FIG. 8 is a schematic block diagram of the detector according to the embodiment. As illustrated in FIG. 8, the detector 40 includes the signal amplifier 42, the AD converter 43, the signal processor 44, a coordinate extractor 45, and a detection timing controller 47. The signal amplifier 42, the AD converter 43, the signal processor 44, the coordinate extractor 45, and the detection timing controller 47 may be different circuits. The detector 40 may be a device including a central processing unit (CPU) as an arithmetic device. In this case, the signal processor 44 and the coordinate extractor 45, for example, may be provided by reading software (program) stored in a storage unit (memory) of the display apparatus 1 and may perform the processing described below by the CPU performing arithmetic operations.

The signal amplifier 42 is a circuit that detects and amplifies the detection signals Vdet output from the second electrodes Rx. Specifically, the signal amplifier 42 integrates electric currents flowing through the second electrodes Rx and converts them into voltages indicating the detection signals Vdet. The detection signals Vdet detected by the signal amplifier 42 are not necessarily amplified and need not be amplified unless necessary.

The AD converter 43 is a circuit that samples analog signals output from the signal amplifier 42 to convert them into digital signals. While the detector 40 causes the AD converter 43 to convert analog signals output from the signal amplifier 42 into digital signals, the configuration is not limited thereto. Specifically, the detector 40 may perform low-pass digital filtering, which corresponds to the function of the signal amplifier 42, on the digital signals resulting from A/D conversion, which corresponds to the function of the AD converter 43.

The signal processor 44 is a circuit that determines whether a touch is detected based on the signals output from the AD converter 43 and outputs the signals received from the AD converter 43 to the coordinate extractor 45 in a touch detection period. If a touch in the cutout region T is detected, the detector 40 outputs, as the output signals, the information that a touch is made in the cutout region T without calculating, by the coordinate extractor 45, the coordinates of the position at which the touch is made. This processing will be described later in detail.

If the signal processor 44 detects a touch, the coordinate extractor 45 calculates the coordinates of the position at which the touch is made based on the digital signals received from the signal processor 44. The coordinate extractor 45 outputs the information on the calculated coordinates as the output signals.

The detection timing controller 47 performs control such that the circuits included in the detector 40 operate synchronously.

Figure 9:
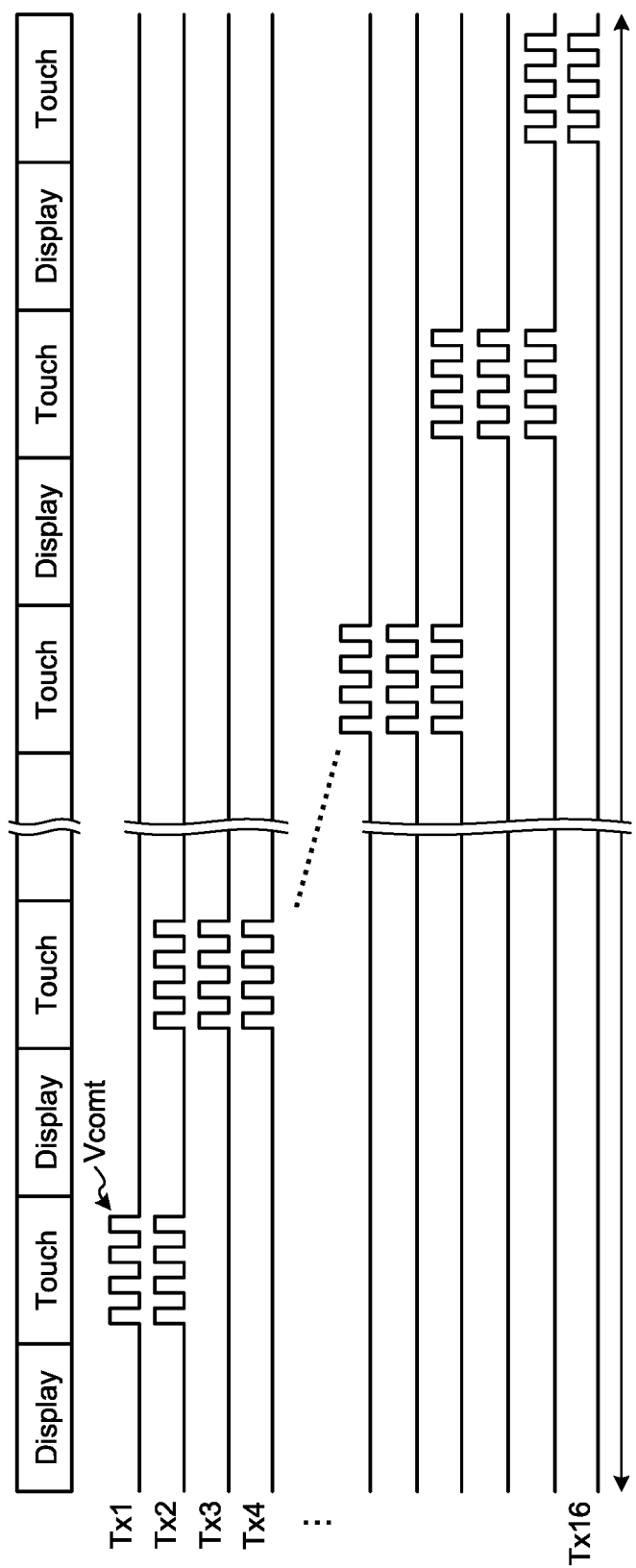
FIG. 9 is a timing chart for explaining an example of touch detection according to the embodiment.

The following describes an outline of the process of image display and touch detection. FIG. 9 is a timing chart for explaining an example of touch detection according to the embodiment. In the embodiment, image display and touch detection are performed in a time-division manner. In other words, the display apparatus 1 is provided alternately with an image display period (Display in FIG. 9) and a touch detection period (Touch in FIG. 9). The controller 11 outputs the control signals to the gate driver 12, the source driver 13, the electrode driver 14, and the detector 40 based on the video signals Vdisp received from outside. The controller 11 thus performs control such that the gate driver 12, the source driver 13, the electrode driver 14, and the detector 40 operate synchronously with one another.

In the image display period, the gate driver 12 outputs the scanning signals Vscan (not illustrated in FIG. 9) to a predetermined number of scanning signal lines GCL of the liquid crystal display panel 20, thereby sequentially selecting lines of the pixels Pix. In the image display period, the source driver 13 outputs the pixel signals Vpix (not illustrated in FIG. 9) to the pixels Pix in the lines selected by the gate driver 12 via the pixel signal lines SGL. In the image display period, the electrode driver 14 applies the display drive signals Vcomd (not illustrated in FIG. 9) to a predetermined number of first electrodes Tx corresponding to the lines selected by the gate driver 12. The display apparatus 1 thus displays an image in the image display period.

In the touch detection period, the electrode driver 14 sequentially applies the detection drive signals Vcomt to a predetermined number (two or three in FIG. 9) of first electrodes Tx, thereby sequentially selecting the first electrodes Tx on which touch detection is to be performed. The detection drive signals Vcomt generate an electric field between the first electrodes Tx and the second electrodes Rx. In other words, the second electrodes Rx generate the detection signals Vdet by the detection drive signals Vcomt applied to the first electrodes Tx. The signal amplifier 42 detects and amplifies the detection signals Vdet output from the second electrodes Rx. The AD converter 43 converts analog signals of the detection signals Vdet output from the signal amplifier 42 into digital signals. The signal processor 44 determines whether a touch is detected based on the digital signals, that is, the voltage values output from the AD converter 43. If the signal processor 44 detects a touch, the coordinate extractor 45 calculates the coordinates of the position at which the touch is made based on the digital signals received from the signal processor 44 and outputs the information on the calculated coordinates as the output signals. The detection timing controller 47 performs control such that the signal amplifier 42, the AD converter 43, the signal processor 44, and the coordinate extractor 45 operate synchronously.

The outline of the process of image display and touch detection is as described above. The following describes the method for touch detection performed by the detector 40 according to the embodiment in greater detail.

As described above, the signal processor 44 of the detector 40 determines whether a touch is detected based on the detection signals Vdet output from the second electrodes Rx. Specifically, the signal processor 44 acquires the difference value $|\Delta V|$, which is an absolute value of a voltage difference $\Delta V$ between a waveform $V_0$ and a waveform $V_1$, based on the detection signals Vdet. In other words, the difference value $|\Delta V|$ is a difference between a voltage value (corresponding to the waveform $V_1$) of the detection signal Vdet detected from the second electrode Rx and a reference value (corresponding to the waveform $V_0$) set in advance as a voltage value detected from the second electrode Rx when no touch is made. Specifically, the difference value $|\Delta V|$ is a difference between the voltage value detected from the second electrode Rx and the reference value. If the difference value $|\Delta V|$ is equal to or greater than a predetermined threshold, the signal processor 44 detects that a touch is made (there is a capacitance change). In the following description, the voltage value of the detection signal Vdet detected from the second electrode Rx is simply referred to as a voltage value.

More specifically, if the signal processor 44 detects that a touch is made, the signal processor 44 determines whether the touch is made in the display region S or the cutout region T. If the voltage value from which the difference value $|\Delta V|$ is determined to be equal to or greater than the threshold is a value of a voltage generated between the first electrode Tx and the second electrode Rx, that is, a first voltage (first signal), the signal processor 44 determines that the touch is made in the display region S. By contrast, if the voltage value from which the difference value $|\Delta V|$ is determined to be equal to or greater than the threshold is a value of a voltage generated between the first electrode Tx and the wiring line U, that is, a second voltage (second signal), the signal processor 44 determines that the touch is made in the cutout region T.

Whether the voltage value is the first voltage or the second voltage is determined as follows. In the following description, for the convenience of explanation, an overlapping first electrode TxO refers to a first electrode Tx (e.g., any one of the first electrodes Tx9 to Tx11 illustrated in FIG. 7) the position of which in the X-axis direction overlaps the position of the cutout region T in the X-axis direction, and an overlapping second electrode RxO refers to a second electrode Rx (e.g., the second electrode Rx1 illustrated in FIG. 7) the position of which in the Y-axis direction overlaps the position of the cutout region T in the Y-axis direction. The position at which the overlapping first electrode TxO and the overlapping second electrode RxO would otherwise overlap corresponds to the cutout region T. As a result, the overlapping first electrode TxO and the overlapping second electrode RxO do not actually overlap. Consequently, a voltage based on which a touch is determined to be made, that is, a voltage from which the difference value |ΔV| is determined to be equal to or greater than the threshold, is not normally generated between the overlapping first electrode TxO and the overlapping second electrode RxO. However, the overlapping first electrode TxO is provided at a position closer to the wiring line U, so that an electric field (voltage) is generated between the overlapping first electrode TxO and the wiring line U. More specifically, since the wiring line U is provided near the cutout region T, a voltage based on which a touch is determined to be made, that is, a voltage from which the difference value |ΔV| is determined to be equal to or greater than the threshold, is generated between the first electrode Tx and the wiring line U when a touch is made in the cutout region T. In addition, the wiring line U is coupled to the overlapping second electrode RxO, and therefore an electric current generated in the wiring line U by the voltage between the first electrode Tx and the wiring line U flows to the overlapping second electrode RxO. As a result, the voltage between the first electrode Tx and the wiring line U is detected by the detector 40 as a voltage value between the overlapping first electrode TxO and the overlapping second electrode RxO. If the voltage between the overlapping first electrode TxO and the overlapping second electrode RxO is detected, the signal processor 44 of the detector 40 determines that the detected voltage is the second voltage, that is, the voltage between the first electrode Tx and the wiring line U. Specifically, if a voltage value from the overlapping second electrode RxO is detected at a timing when the detection drive signal Vcomt is applied to the overlapping first electrode TxO, the signal processor 44 determines that the detected voltage value is the second voltage. By contrast, the signal processor 44 determines that a voltage generated between the first electrode Tx and the second electrode Rx other than the combination of the overlapping first electrode TxO and the overlapping second electrode RxO is the first voltage.

If the voltage value obtained when it is detected that a touch is made (when the difference value |ΔV| is equal to or greater than the threshold) is the second voltage, the detector 40 determines that the touch is made in the cutout region T and outputs the information that the touch is made in the cutout region T, as the output signals. In other words, if the voltage is the second voltage, the detector 40 outputs the information that the touch is made in the cutout region T as the output signals without calculating, by the coordinate extractor 45, the coordinates of the position at which the touch is made. The display apparatus 1 may perform predetermined processing based on the output signals including the information that the touch is made in the cutout region T. The predetermined processing may be any desired processing as long as it is processing set in advance to be performed when a touch is made in the cutout region T. The predetermined processing is starting a predetermined application, for example.

By contrast, if the voltage value obtained when it is detected that a touch is made is the first voltage, the detector 40 determines that the touch is made in the display region S. If the detector 40 determines that the touch is made in the display region S, the coordinate extractor 45 calculates the coordinates of the position at which the touch is made. The coordinate extractor 45 outputs the result of calculating the coordinates of the position at which the touch is made, as the output signals. If the signal processor 44 determines that a touch is made in the display region S, that is, the voltage value is determined to be the first voltage, the coordinate extractor 45 calculates the coordinates of the position at which the touch is made based on the voltage values detected from a plurality of second electrodes Rx. In other words, the detector 40 detects the voltage value (first voltage in this case) between one first electrode Tx and one second electrode Rx for each of the combinations of the first electrode Tx and the second electrode Rx. The coordinate extractor 45 calculates the coordinates of the position at which a touch (proximity) is detected in the display region S based on the detected voltage values (first voltages in this case). In other words, the detector 40 performs the touch detection on the cutout region T based on only the voltage value between the overlapping first electrode TxO and the overlapping second electrode RxO. By contrast, the detector 40 performs the touch detection on the display region S based on the voltage values of a plurality of combinations of the first electrode Tx and the second electrode Rx.

Figure 10:
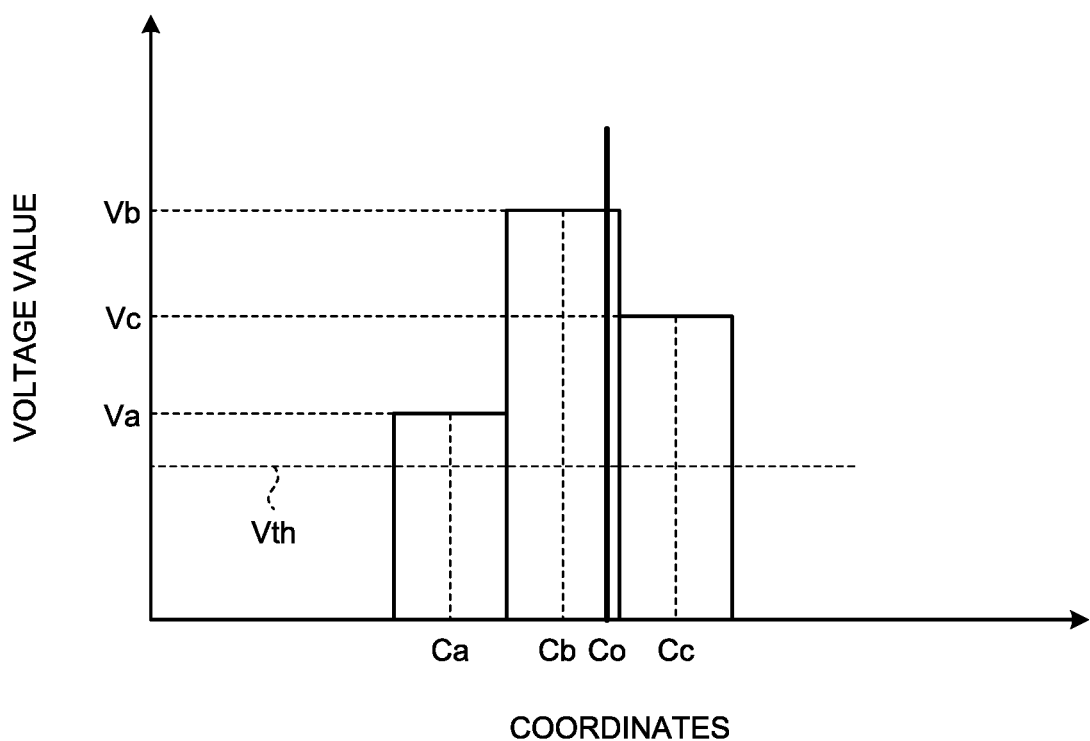
FIG. 10 is a graph for explaining an example of calculation of the coordinates of a touch detection position.

FIG. 10 is a graph for explaining an example of calculation of the coordinates of a touch detection position. A combination of one first electrode Tx and one second electrode Rx from which the voltage value (difference value |ΔV|) is detected, is referred to as an electrode pair. An electrode pair having a voltage value from which the difference value |ΔV| is determined to be equal to or greater than the threshold, is referred to as a proximity electrode pair, which is a pair of electrodes at which a touch (proximity) is detected. The coordinate extractor 45, for example, calculates the coordinates at which a touch is detected in the display region S based on distances between a plurality of proximity electrode pairs and the voltage values of the proximity electrode pairs. FIG. 10 illustrates three adjacent proximity electrode pairs from which voltage values Va, Vb, and Vc exceeding the threshold Vth are detected, for example. The coordinate extractor 45, for example, calculates a center position Ca of the proximity electrode pair having the voltage value Va, a center position Cb of the proximity electrode pair having the voltage value Vb, and a center position Cc of the proximity electrode pair having the voltage value Vc. The center positions Ca, Cb, and Cc may be stored in advance and read by the coordinate extractor 45. The coordinate extractor 45 calculates a coordinate position Co at which the touch is detected in the display region S based on the center positions Ca, Cb, and Cc and the voltage values Va, Vb, and Vc. The coordinate extractor 45, for example, assigns weights to the center positions Ca, Cb, and Cc with the voltage values Va, Vb, and Vc, respectively, such that a position of the center of gravity having a higher voltage value is assigned a larger weight. The coordinate extractor 45 calculates the position of the center of gravity of the weighted center positions as the coordinate position Co. In the example illustrated in FIG. 10, the voltage value increases in the order of the voltage values Va, Vc, and Vb, whereby the weight increases in the order of the center positions Ca, Cc, and Cb. Consequently, in the example illustrated in FIG. 10, a position between the center positions Cb and Cc corresponds to the coordinate position Co serving as the position of the center of gravity. The method for calculating the coordinates of the touch detection position is not limited thereto.

Figure 11:
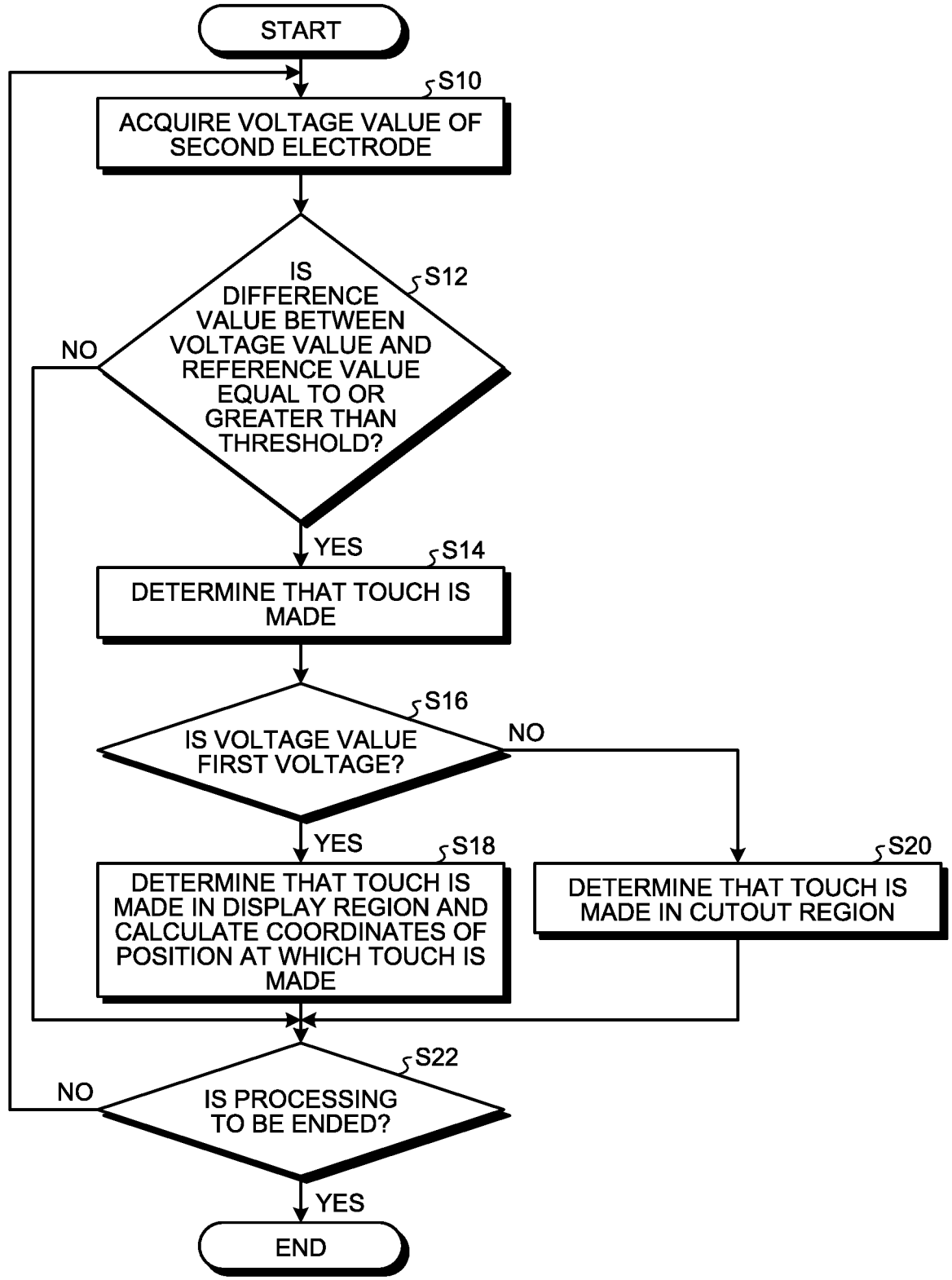
FIG. 11 is a flowchart for explaining touch detection.

The following describes the process of touch detection performed by the detector 40 described above. FIG. 11 is a flowchart for explaining touch detection. As illustrated in FIG. 11, the detector 40 acquires the voltage values from the second electrodes Rx (Step S10). Specifically, in the touch detection period, the detector 40 acquires the detection signals Vdet generated in the second electrodes Rx by the detection drive signals Vcomt applied to the first electrodes Tx, as the voltage values. The detector 40 determines, by the signal processor 44, whether or not the difference value $|\Delta V|$ between the detected voltage value and the reference value is equal to or greater than the threshold (Step S12). If the difference value $|\Delta V|$ is equal to or greater than the threshold (Yes at Step S12), the signal processor 44 of the detector 40 detects that a touch is made (Step S14). If the difference value $|\Delta V|$ is not equal to or greater than the threshold (No at Step S12), that is, if the difference value $|\Delta V|$ is less than the threshold, the signal processor 44 of the detector 40 determines that no touch is made and performs the processing at Step S22.

If the signal processor 44 of the detector 40 determines that a touch is made, the signal processor 44 determines whether the voltage value based on which the touch is detected is the first voltage (Step S16). If the voltage value based on which the touch is detected is a voltage generated between the first electrode Tx and the second electrode Rx other than the combination of the overlapping first electrode TxO and the overlapping second electrode RxO, the signal processor 44 determines that the voltage value is the first voltage (first signal). By contrast, if the voltage value based on which the voltage is determined to be made is a voltage generated between the overlapping first electrode TxO and the overlapping second electrode RxO, the signal processor 44 determines that the voltage value is not the first voltage but the second voltage (second signal).

If the signal processor 44 determines that the voltage value is the first voltage (Yes at Step S16), the detector 40 determines that the touch is made in the display region S, and the coordinate extractor 45 calculates the coordinates of the position at which the touch is made in the display region S (Step S18). The detector 40 outputs the result of coordinate calculation as the output signals. By contrast, if the signal processor 44 determines that the voltage value is not the first voltage (No at Step S16), that is, if the signal processor 44 determines that the voltage value is the second voltage, the detector 40 determines that the touch is made in the cutout region T (Step S20). The detector 40 outputs the information that the touch is made in the cutout region T, as the output signals. After Steps S18 and S20, the detector 40 performs the processing at Step S22. If the processing is not to be ended (No at Step S22), the detector 40 performs the processing at Step S10 again. If the processing is to be ended (Yes at Step S22), the detector 40 ends the present processing.

In the process described above, the detector 40 determines whether or not the voltage value is equal to or greater than the threshold before determining whether the voltage value is the first voltage. In other words, the detector 40 determines whether a touch is detected before determining whether a touch is made in the display region S or the cutout region T. Alternatively, the detector 40 may determine whether the detected voltage value is received from the second electrode Rx belonging to the display region S (the voltage value is the first voltage) or from the wiring line U belonging to the cutout region T, that is, from the overlapping second electrode RxO (the voltage value is the second voltage) before determining whether or not the voltage value is equal to or greater than the threshold. The detector 40 is configured to determine whether the voltage value is the first voltage or the second voltage first, and thus a criterion for determining whether a touch is detected can be different between the first voltage and the second voltage, that is, between the display region S and the cutout region T. In this case, for example, the detector 40 uses, as a criterion value of the second voltage for determining that a proximity is detected, a criterion value that is lower than a criterion value of the first voltage for determining that a proximity is detected. With this mechanism, the detector 40 can detect proximity in the cutout region T with high accuracy. The criterion value for determination is the threshold used to determine whether or not the difference value $|\Delta V|$ is equal to or greater than the threshold, for example. In this case, the detector 40 is configured such that the threshold of the first voltage is different from the threshold of the second voltage and more preferably such that the threshold of the second voltage is less than the threshold of the first voltage. If the voltage value is the second voltage, and the threshold is a fixed value, the criterion value for determination can be changed by multiplying the voltage value of the second voltage by a correction coefficient greater than 1. The criterion for determination is not limited thereto. In the embodiment, the detection drive signals Vcomt are applied to the first electrodes Tx, and the detector 40 acquires the detection signals Vdet, as the voltage values, generated in the second electrodes Rx by the detection drive signals Vcomt applied to the first electrodes Tx and then determines whether a touch is detected, based on the acquired voltage values. The present disclosure, however, is not limited thereto. The detection drive signals Vcomt may be applied to the second electrodes Rx, and the detector 40 may acquire the detection signals Vdet, as the voltage values, generated in the first electrodes Tx by the detection drive signals Vcomt applied to the second electrodes Rx and then determine whether a touch is detected, based on the acquired voltage values. Specifically, when a first electrode TxA included in the first electrodes Tx is, for example, configured to overlap the second electrode Rx2 in a plane view and includes a part arranged along the wiring line U, the first electrode TxA outputs the first signal based on the detection drive signal Vcomt provided to the second electrode Rx2, and outputs the second signal based on the detection drive signal Vcomt provided to the second electrode Rx1.

As described above, the display apparatus 1 according to the embodiment has the display region S with part of its outer periphery cut out. In other words, the display apparatus 1 includes the first substrate SUB1 having the display region S with a recess in part of its outer periphery, the first electrodes Tx, the second electrodes Rx, and the wiring line U. The first electrodes Tx are provided in the display region S. The second electrodes Rx are provided facing the first electrodes Tx in the display region S and configured such that a proximity (touch) to the display region can be detected by an electric field generated between the second electrodes Rx and the first electrodes Tx. At least one of the first electrodes Tx has a shape formed along the outer periphery Ta of the cutout region T occupying the cut-out region (recess) in the display region S. At least one of the second electrodes Rx includes the first partial electrode RxA and the second partial electrode RxB provided in a manner separated from the first partial electrode RxA with the cutout region T interposed therebetween. The wiring line U extends along the outer periphery Ta of the cutout region T and couples the first partial electrode RxA and the second partial electrode RxB. The wiring line U is configured such that a proximity to the cutout region T (recess) can be detected by an electric field generated between the wiring line U and the first electrodes Tx.

If a cut-out part is formed in the display region S, the first electrodes Tx and the second electrodes Rx for proximity detection do not overlap in the cutout region T corresponding to the cut-out part. Consequently, it is difficult to detect proximity to the cutout region T. To address this, the display apparatus 1 according to the embodiment includes the wiring line U extending along the outer periphery Ta of the cutout region T and coupling the first partial electrode RxA and the second partial electrode RxB. With this configuration, the display apparatus 1 can detect proximity to the cutout region T using the potential difference between the wiring line U and the first electrodes Tx. Consequently, the display apparatus 1 can appropriately detect proximity to the cutout region T. For example, an additional sensor other than the first electrodes Tx and the second electrodes Rx may possibly be provided in the cutout region T to detect proximity. In this case, however, the additional sensor needs to be provided. By contrast, the display apparatus 1 according to the embodiment can detect proximity to the cutout region T simply by including the wiring line U coupled to the second electrode Rx. In addition, an electric current for proximity detection output from the wiring line U flows to the second electrode Rx. Thus, the display apparatus 1 simply needs to detect the signal value (voltage value) from the second electrode Rx to detect proximity in the cutout region T in the same manner as the case of proximity detection in the display region S. Consequently, the display apparatus 1 can perform proximity detection in a simpler manner.

The wiring line U is provided outside the display region S. By being provided outside the display region S, the wiring line U is disposed at a position closer to the cutout region T. With this configuration, the display apparatus 1 can detect proximity in the cutout region T with high accuracy.

The second electrodes Rx are each composed of a plurality of metal lines MT. The width of the wiring line U is greater than that of the metal line MT. With the second electrodes Rx each composed of a plurality of metal lines MT in the display region S, the display apparatus 1 can prevent reduction in the visibility of images. With the wiring line U having the width greater than that of the metal line MT, the display apparatus 1 can reduce electrical resistance of the wiring line U and prevent deterioration in the accuracy of detecting proximity in the cutout region T.

The first electrodes Tx extend in the first direction (Y-direction) and are arrayed in the second direction (X-axis direction) intersecting the first direction. The second electrodes Rx each include a coupling portion RB provided at one end or both ends in the second direction and detection portions RA extending from the coupling portion RB in the second direction. The second electrodes Rx are arrayed in the first direction. With the first electrodes Tx and the second electrodes Rx having a strip shape and arrayed in the respective directions orthogonal to each other, the display apparatus 1 can appropriately detect proximity.

The display apparatus 1 includes the detector 40 that detects the first voltage generated by an electric field between the first electrode Tx and the second electrode Rx and the second voltage generated by an electric field between the first electrode Tx and the wiring line U. The detector 40 detects the first voltage between one first electrode Tx and one second electrode Rx for each of the combinations (electrode pairs) of the first electrode Tx and the second electrode Rx. Based on the detected first voltages, the display apparatus 1 calculates the coordinates of the position at which a proximity is detected in the display region S. If the detector 40 detects the second voltage, the detector 40 determines that a proximity to the cutout region T is detected. If the detector 40 detects the second voltage, the display apparatus 1 determines that a proximity is detected in the cutout region T without performing coordinate calculation. By contrast, if the detector 40 detects the first voltage, the display apparatus 1 calculates the position at which a proximity is detected in the display region S by performing coordinate calculation. Consequently, the display apparatus 1 can simply and readily detect proximity in the cutout region T where the proximity position is fixed in some degree. Furthermore, the display apparatus 1 performs coordinate calculation on the display region S having many candidates of the proximity position, thereby detecting the coordinates of the proximity position with high accuracy. If the display apparatus 1 includes a plurality of overlapping first electrodes TxO to be used for detecting proximity by combination with the wiring line U and/or includes a plurality of wiring lines U, for example, the detector 40 may detect the coordinates based on the voltage values of a plurality of combinations of the overlapping first electrode TxO and the wiring line U by the same method as the method employed for the display region S.

The detector 40 detects, as a proximity electrode pair, a combination of the first electrode Tx and the second electrode Rx that have a difference between the first voltage and the predetermined reference value, the difference being equal to or greater than the predetermined threshold. The detector 40 is capable of detecting a plurality of the proximity electrode pairs. The detector 40 calculates the coordinates at which a proximity is detected in the display region S based on the distances between the detected proximity electrode pairs and the differences (voltage values) of the respective proximity electrode pairs. By contrast, if the difference between the second voltage and the predetermined reference value is equal to or greater than the predetermined threshold, the detector 40 determines that a proximity to the cutout region T is detected and outputs the detection result. As described above, the detector 40 detects the proximity coordinates in the display region S based on the distances and the voltage values of the proximity electrode pairs. Thus, the detector 40 can detect proximity with high accuracy.

The detector 40 may be configured such that the criterion for determining whether a proximity is detected differs between the first voltage and the second voltage. With the criterion for proximity detection different between the display region S and the cutout region T, the detector 40 can appropriately detect proximity especially in the cutout region T.

Out of other advantages provided by the aspects described in the embodiment, advantages clearly defined by the description in the present specification or appropriately conceivable by those skilled in the art are naturally provided by the present invention.

What is claimed is:
1. A display apparatus comprising:
a first substrate that has a display region having an outer periphery having part where a recess is formed;
a plurality of first electrodes provided in the display region;

a plurality of second electrodes provided facing the first electrodes in the display region; and a wiring line, wherein at least one of the first electrodes has a shape formed along an outer periphery of the recess in the display region, wherein at least one of the second electrodes includes a first partial electrode and a second partial electrode provided in a manner separated from the first partial electrode with the recess interposed therebetween, wherein the wiring line extends along the outer periphery of the recess to couple the first partial electrode and the second partial electrode, wherein the second electrodes include a first one of the second electrodes and a second one of the second electrodes arranged next to the first one of the second electrode in a first direction, wherein the first one of the second electrodes includes the first partial electrode and the second partial electrode, wherein the second one of the second electrodes extends in a second direction intersecting the first direction, and wherein a length of the second one of the second electrode in a second direction is longer than a length of the first partial electrode in the second direction.

2. The display apparatus according to claim 1,
wherein the wiring line is provided outside the display region.

3. The display apparatus according to claim 1,
wherein each of the second electrodes are composed of a plurality of metal lines, and
wherein a width of the wiring line is greater than a width of each of the metal lines.

4. The display apparatus according to claim 1,
wherein a width of the first partial electrode in a first direction is greater than a width of the wiring line, and
wherein the first partial electrode extends in a second direction intersecting the first direction.

5. The display apparatus according to claim 1,
wherein the first electrodes extend in a first direction and are arrayed in a second direction intersecting the first direction,
wherein each of the second electrodes includes a coupling portion provided at one end or both ends in the second direction and detection portions coupled to the coupling portion and extending from the coupling portion in the second direction, and
wherein the second electrodes are arrayed in the first direction.

6. The display apparatus according to claim 1,
wherein a width of the second one of the second electrodes is greater than a width of the first partial electrode in the first direction.

7. The display apparatus according to claim 1,
wherein a first one of the first electrodes overlaps the second one of the second electrodes in a plane view and includes a part arranged along the wiring line.

8. The display apparatus according to claim 7,
wherein the second one of the second electrodes outputs a first signal based on a detection drive signal provided to the first one of the first electrodes, and
wherein the first one of the second electrodes outputs a second signal based on the detection drive signal provided to the first one of the first electrodes.

9. The display apparatus according to claim 7,
wherein the first one of the first electrodes outputs a first signal based on a detection drive signal provided to the second one of the second electrodes, and wherein the first one of the first electrodes outputs a second signal based on the detection drive signal provided to the first one of the second electrodes.

10. The display apparatus according to claim 1, further comprising:
a detector configured to detect a first signal output from the second one of the second electrodes and a second signal output from the first one of the second electrodes.

11. The display apparatus according to claim 10,
wherein the detector is configured to detect proximity to the second one of the second electrodes by a conductor based on the first signal, and
wherein the detector is configured to detect proximity to the wiring line coupled to the first one of the second electrodes by a conductor based on the second signal.

12. The display apparatus according to claim 11,
wherein the detector is configured to determine whether a conductor is in proximity to the second one of the second electrodes based on whether the first signal is greater than a first predetermined threshold, and
wherein the detector is configured to determine whether a conductor is in proximity to the wiring line coupled to the first one of the second electrodes based on whether the second signal is greater than a second predetermined threshold different from the first predetermined threshold.

13. The display apparatus according to claim 1,
wherein the at least one of the second electrode further includes a third partial electrode and a fourth partial electrode provided in a manner separated from the third partial electrode with the recess interposed therebetween, and
wherein the wiring line couples the first partial electrode, the second partial electrode, the third partial electrode, and the fourth partial electrode.

14. The display device according to claim 13,
wherein the first partial electrode is arranged next to the third partial electrode in a first direction, and
wherein a length of the third partial electrode is longer than a length of the first partial electrode in a second direction intersecting the first direction.

15. The display device according to claim 1, further comprising:
a first partial wiring line;
a second partial wiring line; and
a coupling line extends along the outer periphery of the recess to couple the first partial wiring line and the second partial wiring line outside the display region.

16. The display device according to claim 15,
wherein the first partial electrode is arranged next to the first partial wiring line in a first direction, and
wherein a width of the first partial wiring line is greater than a width of the first partial electrode in the first direction.

17. The display device according to claim 15,
wherein the first partial wiring line is provided with a fixed voltage.

18. A proximity detection method for detecting proximity to a display apparatus having a display region having an outer periphery with a recess,
wherein the display apparatus includes a plurality of first electrodes provided in the display region, a plurality of second electrodes provided facing the first electrodes in the display region, and a wiring line,
wherein at least one of the first electrodes has a shape formed along the recess in the display region, at least one of the second electrodes includes a first partial electrode and a second partial electrode provided in a manner separated from the first partial electrode with the recess interposed therebetween, and the wiring line extends along the recess to couple the first partial electrode and the second partial electrode, and wherein the method comprises:

detecting a proximity to the display region based on an electric field generated between the first electrodes and the second electrodes; and detecting a proximity to the recess based on an electric field generated between the first electrodes and the wiring line.

19. A detection device comprising:

a first substrate that has an outer periphery having part where a recess is formed;

a plurality of first electrodes provided on the first substrate;

a plurality of second electrodes provided facing the first electrodes; and a wiring line, wherein at least one of the first electrodes has a shape formed along an outer periphery of the recess, wherein at least one of the second electrodes includes a first partial electrode and a second partial electrode provided in a manner separated from the first partial electrode with the recess interposed therebetween, wherein the wiring line extends along the outer periphery of the recess to couple the first partial electrode and the second partial electrode, wherein the second electrodes include a first one of the second electrodes and a second one of the second electrodes arranged next to the first one of the second electrode in a first direction, wherein the first one of the second electrodes includes the first partial electrode and the second partial electrode, wherein the second one of the second electrodes extends in a second direction intersecting the first direction, and wherein a length of the second one of the second electrode in a second direction is longer than a length of the first partial electrode in the second direction.

* * * * *